US012444871B2

(12) United States Patent
Luo et al.

(10) Patent No.: US 12,444,871 B2
(45) Date of Patent: Oct. 14, 2025

(54) PLUG TERMINAL, PLUG AND ENERGY STORAGE HIGH-VOLTAGE CONNECTOR

(71) Applicant: TI-LANE PRECISION ELECTRONIC CO., LTD., Shenzhen (CN)

(72) Inventors: Baojun Luo, Shenzhen (CN); Haifeng Zhang, Zhuzhou (CN)

(73) Assignee: TI-Lane Precision Electronic Co., Ltd., Shenzhen (CN)

( * ) Notice: Subject to any disclaimer, the term of this patent is extended or adjusted under 35 U.S.C. 154(b) by 337 days.

(21) Appl. No.: 18/117,801

(22) Filed: Mar. 6, 2023

(65) Prior Publication Data

US 2023/0318216 A1 Oct. 5, 2023

(30) Foreign Application Priority Data

Mar. 28, 2022 (CN) ......................... 202220698643.8
Mar. 28, 2022 (CN) ......................... 202220698691.7

(51) Int. Cl.
*H01R 13/187* (2006.01)
*H01R 12/72* (2011.01)
*H01R 13/53* (2006.01)
*H01R 13/627* (2006.01)

(52) U.S. Cl.
CPC ........... *H01R 13/187* (2013.01); *H01R 12/72* (2013.01); *H01R 13/53* (2013.01); *H01R 13/6277* (2013.01)

(58) Field of Classification Search
CPC ...... H01R 13/187; H01R 12/72; H01R 13/53; H01R 13/6277; H01R 13/5219; H01R 43/16; H01R 13/10
See application file for complete search history.

(56) References Cited

U.S. PATENT DOCUMENTS 3,813,645 A * 5/1974 Elliott .................... H01R 24/20 72/369
4,598,971 A * 7/1986 Goodman ............ H01R 11/285 439/759
5,297,971 A * 3/1994 Nitta ....................... H01R 13/53 439/125
5,931,690 A * 8/1999 Sai ....................... H01R 13/625 439/522

* cited by examiner

*Primary Examiner* — Travis S Chambers
(74) *Attorney, Agent, or Firm* — Bay State IP, LLC

(57) ABSTRACT

The present disclosure provides a plug terminal, a plug and an energy storage high-voltage connector and solves the problems that after the existing plug terminal is used, the temperature rise is too high after passing through a large current and the processing cost is too high. According to the present disclosure, the plug terminal is arranged as a 90° elbow formed by bending the middle section of a single pipe, comprising a plug-in pipe body, a flat pipe section and a wiring pipe body which are connected in sequence; the axis of the plug-in pipe body is intersected with and is perpendicular to the axis of the wiring pipe body; and the flat pipe section is arranged as a continuous flat pipe structure formed by pressing some pipe sections of the single pipe.

18 Claims, 17 Drawing Sheets

PLUG TERMINAL, PLUG AND ENERGY STORAGE HIGH-VOLTAGE CONNECTOR

CROSS-REFERENCE TO RELATED APPLICATION

This patent application claims the priority of Chinese Patent Application No. CN202220698691.7 filed in China National Intellectual Property Administration on Mar. 28, 2022 and entitled as "PLUG TERMINAL AND PLUG OF ENERGY STORAGE HIGH-VOLTAGE CONNECTOR AND ENERGY STORAGE HIGH-VOLTAGE CONNECTOR", and claims the priority of Chinese Patent Application No. CN202220698643.8 filed in China National Intellectual Property Administration on Mar. 28, 2022 and entitled as "INSERTING FOOLPROOF AND ROTATABLE ENERGY STORAGE HIGH-VOLTAGE CONNECTOR", the disclosure of which is incorporated by reference herein in its entirety.

TECHNICAL FIELD

The present disclosure relates to the technical field of energy storage high-voltage connectors, in particular to a plug terminal for a plug of an energy storage high-voltage connector, a plug equipped with the plug terminal and an energy storage high-voltage connector equipped with the plug.

BACKGROUND

The plug terminal of the existing energy storage high-voltage connector is a 90° special-shaped elbow, which is generally formed by riveting two pipes with different diameters. Specifically, the riveting end of a straight pipe is flattened and a hole is opened, and then the other straight pipe is abutted and riveted with this hole to form a 90° special-shaped elbow. At present, the energy storage high-voltage connector is required to be capable of being charged and discharged quickly. In order to achieve this requirement, the energy storage high-voltage connector needs to be able to carry more current. However, the existing special-shaped elbow is riveted by two pipes. A connection point is formed at the riveted position, which will increase the contact resistance and will result in the problem of high temperature rise after passing through a large current. In addition, two pipes with different diameters need to be purchased separately. The two pipes need to be cut and riveted during production, resulting in high processing cost of a plug terminal.

The anti-contact pointer and the shell of the plug of the existing energy storage high-voltage connector are two separate injection-molded parts, and the anti-contact pointer needs to be assembled to the shell for use. This situation requires high machining accuracy and assembly accuracy of the anti-contact pointer and the shell. The problem of poor concentricity between the anti-contact pointer and the plug terminal due to the fact that it is easy for the anti-contact pointer to loosen often occurs, which leads to the problem that the anti-contact pointer of the plug and the anti-contact finger cap of the socket cannot be aligned and leads to the problem that the insertion is not smooth or even impossible. Moreover, the anti-contact pointer and the shell need to be injection molded twice, which results in the problem of high production cost of the plug. In addition, the plug-in pipe body of the plug terminal and the wiring pipe body are interconnected, which will not prevent water vapor from entering the plug-in pipe body and reaching the wire in the wiring pipe body and will easily lead to the oxidation of the wire conductor.

With the development, the vacant space in the existing cabinet becomes less and less, the limited space has more and more restrictions on wiring, and the requirements are getting higher and higher. Therefore, it is necessary to ensure that the plug has the function of preventing the wrong insertion of the positive and negative electrodes, and it is also necessary to have the function of wiring in different directions after the plug is inserted into the socket. However, the existing energy storage high-voltage connectors are connected in the manner of mutual insertion of shaft hole. Although the connectors can rotate with respect to each other after insertion, the connectors have no function of preventing the wrong insertion of the positive and negative electrodes. In order to prevent the wrong insertion of the positive and negative electrodes, the existing energy storage high-voltage connector will be provided with anti-fool structures such as bumps and chutes which are matched with each other on the shaft hole structure inserted into each other, so as to realize the function of preventing the wrong insertion of the positive and negative electrodes. However, after the plug is inserted into the socket, the chutes will limit the circumferential movement of the bumps and make the plug unable to rotate. Therefore, the existing energy storage high-voltage connector can only have one of the functions of preventing the wrong insertion of the positive and negative electrodes and being able to rotate 360 degrees after being inserted, and cannot meet the requirements of preventing the wrong insertion of the positive and negative electrodes and being able to rotate 360 degrees after being inserted at the same time.

SUMMARY

One of the objects of the present disclosure is to design a plug terminal, a plug and an energy storage high-voltage connector, solving the problems that after the existing plug terminal is used, the temperature rise is too high after passing through a large current and the processing cost is too high.

The present disclosure is realized by the following technical scheme.

The present disclosure provides a plug terminal, wherein the plug terminal is arranged as a 90° elbow formed by bending the middle section of a single pipe, comprising a plug-in pipe body, a flat pipe section and a wiring pipe body which are connected in sequence; the axis of the plug-in pipe body is intersected with and is perpendicular to the axis of the wiring pipe body; and the flat pipe section is arranged as a continuous flat pipe structure formed by pressing some pipe sections of the single pipe.

When the above arrangement structure is used, the plug terminal is a 90° elbow formed by bending the middle section of a single pipe, wherein the flat pipe section is a continuous flat pipe structure formed by pressing some pipe sections of the single pipe. Compared with the existing plug terminal formed by riveting two types of pipes, the plug terminal is formed by pressing and bending a single pipe, which not only reduces the multi-point connection of the terminal to lower the impedance of the whole plug terminal, so as to solve the problem that the temperature rise is too high after passing through a large current, but also reduces the types of manufacturing materials and assembly times of the plug terminal to reduce the processing cost. At the same time, the structural reliability of the plug terminal can be improved to a certain extent.

Further, in order to better realize the present disclosure, the following arrangement structure is particularly used: the flat pipe section is arranged as a flat pipe structure formed by pressing along the axial direction of the plug-in pipe body.

Further, in order to better realize the present disclosure, the following arrangement structure is particularly used: the flat pipe section is arranged toward the side of the wiring pipe body far from the plug-in pipe body.

Further, in order to better realize the present disclosure, the following arrangement structure is particularly used: the outer diameter of the plug-in pipe body is smaller than that of the wiring pipe body. The inner diameter of the plug-in pipe body is smaller than that of the wiring pipe body.

The present disclosure further provides a plug, comprising a shell and the plug terminal described above, wherein the plug terminal is arranged in the shell.

Further, in order to better realize the present disclosure, the following arrangement structure is particularly used: the shell comprises a plug housing, the plug terminal is arranged in the plug housing, and a plug rotary spring terminal is inserted into the plug-in pipe body.

Further, in order to better realize the present disclosure, the following arrangement structure is particularly used: the plug anti-contact pointer and the plug housing are assembled in a split manner. Specifically, one end of the flat pipe section connected with the plug-in pipe body is provided with a through hole, the axis of the through hole is collinear with the axis of the plug-in pipe body, and a plug anti-contact pointer extending into the plug-in pipe body is inserted into the through hole.

Further, in order to better realize the present disclosure, the following arrangement structure is particularly used: the plug anti-contact pointer and the plug housing are integrally molded. Specifically, a plug anti-contact pointer coaxially arranged with the plug-in pipe body is arranged in the plug-in pipe body, and the peripheral wall of the plug-in pipe body is provided with a piercing hole; the plug anti-contact pointer is fixedly connected with a connecting post extending along the side of the plug anti-contact pointer, the connecting post is fixedly connected with the inner wall of the plug housing through the piercing hole, and the connecting post is integrally molded with the plug anti-contact pointer and the inner wall of the plug housing.

When the above structure is used, the plug anti-contact pointer is integrally molded with the plug housing, so that the concentricity of the plug anti-contact pointer and the plug-in pipe body of the plug terminal can be ensured, and the possibility that the plug anti-contact pointer is loosened due to assembly problems can be eliminated. The smoothness when the plug is inserted into the socket can be maintained for a long time, and the one-time molding process can be reduced, so that the production cost can be reduced.

Further, in order to better realize the present disclosure, the following arrangement structure is particularly used: the plug housing comprises an internal mold and an external mold, the internal mold is sleeved on the plug terminal and is integrally molded therewith, and the external mold is sleeved on the internal mold and is integrally molded therewith; the connecting post is integrally molded with the internal mold.

Further, in order to better realize the present disclosure, the following arrangement structure is particularly used: the plug-in pipe body is provided with two piercing holes distributed in the radial direction, and each of the piercing holes penetrates through the connecting post.

Further, in order to better realize the present disclosure, the following arrangement structure is particularly used: the tail of the plug anti-contact pointer is in sealing connection with the inner wall of the plug terminal to seal off the plug-in pipe body from the wiring pipe body.

When the above structure is used, the gap between the plug-in pipe body of the plug terminal and the wiring pipe body is blocked by the tail of the plug anti-contact pointer, so that the water vapor entering from the plug-in pipe body cannot reach the wiring pipe body through the inside of the plug terminal, resulting in oxidation of the wire conductor.

The present disclosure further provides an energy storage high-voltage connector, comprising a socket and the plug described above, wherein the plug and the socket are detachably inserted together, and the plug terminal installed in the plug is connected with a socket terminal installed in the socket.

Further, in order to better realize the present disclosure, the following arrangement structure is particularly used: a circular jack is arranged at the inserting end of the plug housing, the plug-in pipe body of the plug terminal is coaxially arranged in the jack; the socket comprises a socket housing, the inserting end of the socket housing is provided with a second circular plug barrel detachably inserted into the jack, the second plug barrel is coaxially arranged with the jack, and the socket terminal is coaxially arranged in the second plug barrel;

the hole wall of the jack is provided with a plurality of first through slots which are arranged in sequence in the circumferential direction, the first through slots extend in the radial direction, notches of the first through slots are formed at the edge of the jack, fingers extending axially towards the notches of the first through slots are arranged at the slot bottoms of the first through slots, guide blocks extending towards the outer wall of the second plug barrel are arranged at the head ends of the fingers, the radial inner side surface of the guide block is in contact with the outer wall of the second plug barrel or is provided with a radial gap so that the plug has the ability to rotate with respect to the socket about the axis of the jack;

a convex ring coaxial with the jack is arranged on the outer wall of the inserting end of the second plug barrel, the axial distance between the convex ring and the guide block is equal to or greater than 0, the radius of the outer circular surface of the convex ring is larger than the distance between the radial inner side surface of the guide block and the axis of the jack, the convex ring is provided with a plurality of second through slots which are arranged in sequence in the circumferential direction and extend in the axial direction, and the radial distance between the slot bottom of the second through slot and the axis of the second plug barrel is less than or equal to the radial distance between the radial inner side surface of the guide block and the axis of the jack;

the number of the second through slots is equal to the number of the first through slots, and all the second through slots and all the guide blocks are axially aligned one by one in the circumferential direction.

When the above arrangement structure is used, the plug housing is provided with a circular jack, and the socket housing is provided with a second circular plug barrel. In this way, there are no fool-proof structures such as bumps and chutes which are matched with each other at the inserting part of the plug housing and the socket housing. The plug can rotate 360 degrees after being inserted, so as to facilitate wiring in different directions in the cabinet. Fingers are also arranged in a plurality of first through slots arranged in the plug housing, and guide blocks are arranged at the ends of the fingers. Meanwhile, a convex ring arranged on a second plug barrel of the socket housing is provided with second through slots corresponding to the guide blocks one by one, so that the plug housing can only be inserted into the socket housing at a specific angle. Because the number of the second through slots is equal to the number of the first through slots, all the second through slots and all the guide blocks are axially aligned one by one in the circumferential direction. In this way, the plug housing and the socket housing have a fool-proof function, and only by changing the set number and the design angle of the second through slots of the positive electrode and the negative electrode, the wrong insertion of the positive electrode and the negative electrode can be effectively prevented. After the plug is inserted to the socket, the axial distance between the convex ring and the guide block is equal to or greater than 0, so that the plug can rotate 360 degrees while having the fool-proof function.

Further, in order to better realize the present disclosure, the following arrangement structure is particularly used: the energy storage high-voltage connector is provided with a negative electrode member and a positive electrode member cooperating with each other, and compared with the positive electrode member, the negative electrode member is provided with a different number of the second through slots and/or is provided with a different angle between two adjacent second through slots.

Further, in order to better realize the present disclosure, the following arrangement structure is particularly used: the fingers are elastic, the surface of the guide block adjacent to the convex ring is provided as a slope surface, when the plug is pulled out in the axial direction, in the case that the second through slot and the corresponding guide block are mutually staggered in the circumferential direction, the top of the convex ring abuts against the slope surface, so that the fingers bend and deform outward and slide from the top of the convex ring to finally detach the second plug barrel from the jack.

When the above arrangement structure is used, the fingers with elasticity can bend and deform to a certain extent in the radial direction, so that the ends of the fingers can be far from the axis of the jack. Meanwhile, the surface of the guide block adjacent to the convex ring is provided as a slope surface, so that the guide block can slide from the top of the convex ring by jacking the fingers through the convex ring when pulling out the plug. In this way, the plug can be pulled out from all directions without the guide block withdrawing from the corresponding second through slot.

Further, in order to better realize the present disclosure, the following arrangement structures are particularly used: one end face of the guide block far from the convex ring and one end face of the convex ring far from the guide block are provided as planes perpendicular to the axis of the jack.

When the above arrangement structure is used, one end face of the guide block far from the convex ring and one end face of the convex ring far from the guide block are provided as planes perpendicular to the axis of the jack, so that the violent insertion of the plug can be effectively prevented, and the wrong insertion of the positive and negative electrodes can be effectively avoided.

Further, in order to better realize the present disclosure, the following arrangement structure is particularly used: a first plug barrel protruding in the axial direction is arranged in the jack, the plug-in pipe body of the plug terminal is integrally located in the first plug barrel, and the first plug barrel is detachably inserted into the second plug barrel in the axial direction.

Further, in order to better realize the present disclosure, the following arrangement structure is particularly used: the plug further comprises a plug wire clamping cap sleeved on the wiring pipe body of the plug terminal and a plug nut sleeved on the plug wire clamping cap, and one end of the plug nut is screwed with the plug housing.

Further, in order to better realize the present disclosure, the following arrangement structure is particularly used: a plug T-shaped waterproof ring sleeved on the wiring pipe body of the plug terminal is inserted into the plug wire clamping cap, a plug waterproof ring is sleeved on the first plug barrel, and the socket housing is sleeved with a socket waterproof gasket.

Further, in order to better realize the present disclosure, the following arrangement structure is particularly used: the end of the socket terminal is connected with a socket anti-contact finger cap which is used in cooperation with the plug anti-contact pointer arranged in the plug-in pipe body of the plug terminal.

Further, in order to better realize the present disclosure, the following arrangement structure is particularly used: the plug housing is provided with a locking mechanism for locking with the socket when being inserted into the socket.

The present disclosure has the following advantages and beneficial effects.

In the present disclosure, the plug terminal is a 90° elbow formed by bending the middle section of a single pipe, wherein the flat pipe section is a continuous flat pipe structure formed by pressing some pipe sections of the single pipe. Compared with the existing plug terminal formed by riveting two types of pipes, the plug terminal is formed by pressing and bending a single pipe, which not only reduces the multi-point connection of the terminal to lower the impedance of the whole plug terminal, so as to solve the problem that the temperature rise is too high after passing through a large current, but also reduces the types of manufacturing materials and assembly times of the plug terminal to reduce the processing cost. At the same time, the structural reliability of the plug terminal can be improved to a certain extent.

BRIEF DESCRIPTION OF THE DRAWINGS

In order to explain the embodiments of the present disclosure or the technical schemes in the prior art more clearly, the drawings that need to be used in the description of the embodiments or the prior art will be briefly introduced hereinafter. Obviously, the drawings in the following description are only some embodiments of the present disclosure. For those skilled in the art, other drawings can be obtained according to these drawings without any creative effort.

REFERENCE NUMBER IN THE FIGURES

Figure 1:
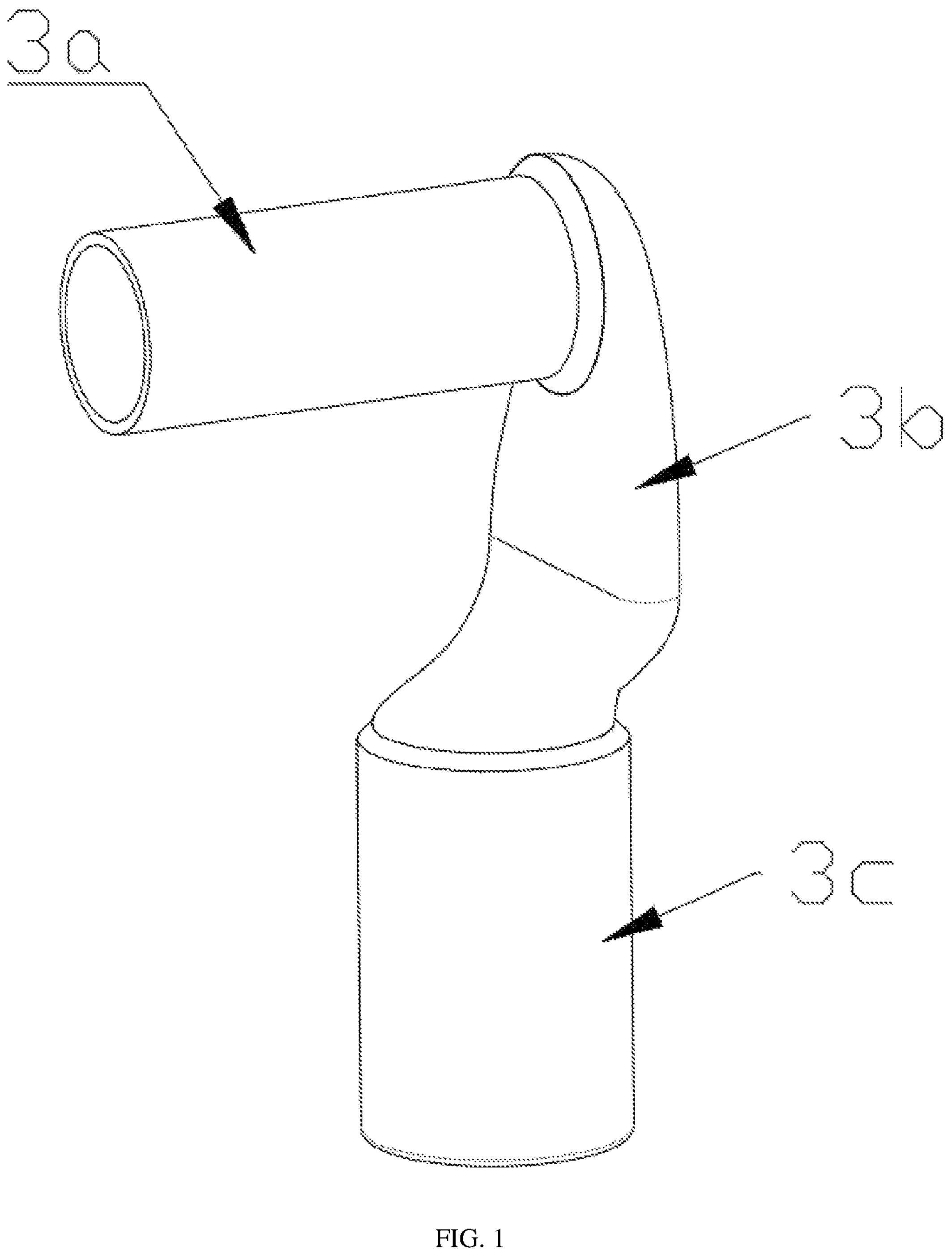
FIG. 1 is a schematic diagram of the external structure of a plug terminal using a first basic structure.

1. Plug housing; 1*a*. Internal mold; 1*a*1. Cavity; 1*a*2. First plug barrel; 1*b*. External mold; 1*b*1. Guide block; 1*b*2. Slope surface; 1*c*. Jack;
2. Plug anti-contact pointer; 2*a*. Connecting post; 2*b*. Tail;
3. Plug terminal; 3*a*. Plug-in pipe body; 3*a*1. Piercing hole; 3*b*. Flat pipe section; 3*c*. Wiring pipe; 3*d*. Through hole;
4. Plug button;
5. Plug spring;
6. Plug T-shaped waterproof ring;
7. Plug wire clamping cap;
8. Plug nut;
9. Plug rotary spring terminal;
10. Plug waterproof ring;
11. Socket shell; 11*a*. Second plug barrel; 11*b*. Convex ring; 11*c*. Second through slot;
12. Socket anti-contact finger cap;
13. Socket terminal;
14. Socket waterproof gasket

DETAILED DESCRIPTION OF THE EMBODIMENTS

In order to make the object, technical scheme and advantages of the present disclosure clearer, the technical scheme of the present disclosure will be described in detail hereinafter. Obviously, the described embodiments are only part of the embodiments of the present disclosure, rather than all of the embodiments. Based on the embodiment of the present disclosure, all other embodiments obtained by those skilled in the art without any creative effort belong to the scope of protection of the present disclosure.

In the description of the present disclosure, it should be noted that, unless otherwise stated, "a plurality of" means two or more; the orientational or positional relationships indicated by the terms such as "up", "down", "left", "right", "inside", "outside", "front end", "back end", "head" and "tail" are based on the orientational or positional relationships shown in the drawings only for the convenience of describing the present disclosure and simplifying the description, rather than indicate or imply that the referred devices or elements must have a specific orientation, be constructed and operated in a specific orientation, and therefore should not be construed as limiting the present disclosure. In addition, the terms such as "first", "second" and "third" are only used for the purpose of description, and cannot be understood as indicating or implying relative importance.

In the description of the present disclosure, it should also be noted that unless otherwise specified and defined expressly, the terms such as "install", "link" and "connect" should be understood broadly, for example, it can be fixed connection, detachable connection or integral connection; or mechanical connection or electrical connection; or direct connection or indirect connection through an intermediate medium. For those skilled in the art, the specific meanings of the above terms in the present disclosure can be understood according to specific situations.

Embodiment 1

A plug terminal is provided, which has better structural performance, fewer installation steps and lower production cost. As shown in FIG. 1 to FIG. 11, the plug terminal is specially arranged in the following structure.

As shown in FIGS. 1-4, the plug terminal of the energy storage high-voltage connector is arranged as a 90° elbow formed by bending the middle section of a single pipe. The plug terminal comprises a plug-in pipe body 3*a*, a flat pipe section 3*b* and a wiring pipe body 3*c* which are connected in sequence. The plug-in pipe body 3*a* is a circular pipe, the wiring pipe body 3*c* is a circular pipe, and the flat pipe section 3*b* is a continuous flat pipe structure formed by pressing some pipe sections of a single pipe. The inner walls of the flat pipe section 3*b* are in contact with each other or have a slight gap. The flat pipe section 3*b* is arranged as a flat pipe structure formed by pressing along the axial direction of the plug-in pipe body 3*a*. The flat pipe section 3*b* is arranged integrally toward the side of the wiring pipe body 3*c* far from the plug-in pipe body 3*a*. Both ends of the flat pipe section 3*b* are gradually flared and are connected with one end of the plug-in pipe body 3*a* and the wiring pipe body 3*c*. The axis of the plug-in pipe body 3*a* is intersected with and is perpendicular to the axis of the wiring pipe body 3*c*, and the axis of one end of the flat pipe section 3*b* connected with the plug-in pipe body 3*a* is collinear with the axis of the plug-in pipe body 3*a*.

In the present disclosure, the plug terminal is a 90° elbow formed by bending the middle section of a single pipe, wherein the flat pipe section 3*b* is a continuous flat pipe structure formed by pressing some pipe sections of the single pipe. Compared with the existing plug terminal formed by riveting two types of pipes, the plug terminal is formed by pressing and bending a single pipe, which not only reduces the multi-point connection of the terminal to lower the impedance of the whole plug terminal, so as to solve the problem that the temperature rise is too high after passing through a large current, but also reduces the types of manufacturing materials and assembly times of the plug terminal to reduce the processing cost. At the same time, the structural reliability of the plug terminal can be improved to a certain extent.

Figure 2:
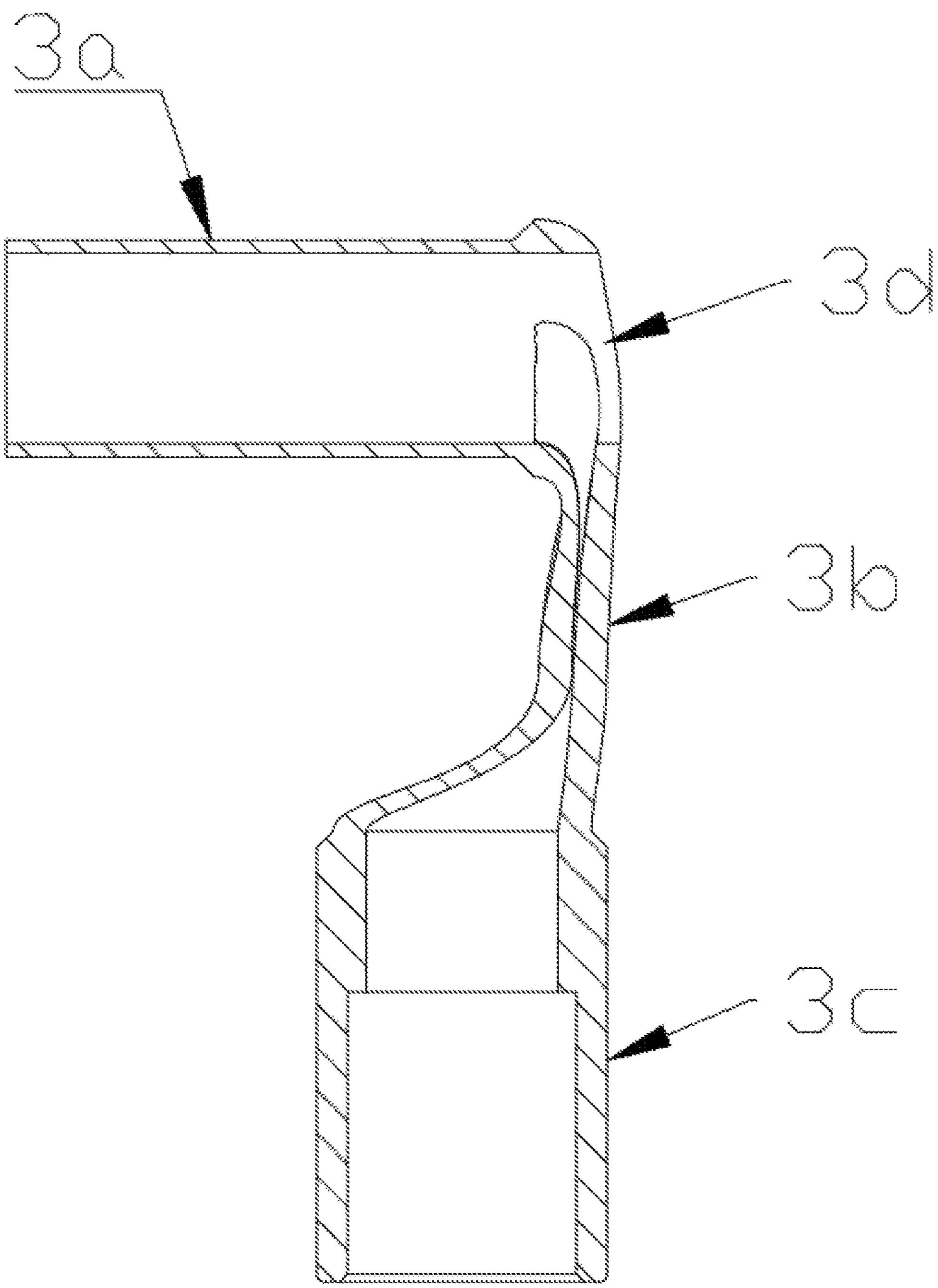
FIG. 2 is a schematic diagram of the cross-sectional structure of a plug terminal using a first basic structure.

In this embodiment, the plug terminal 3 has two basic structures. A first basic structure is shown in FIGS. 1 and 2.

Figure 3:
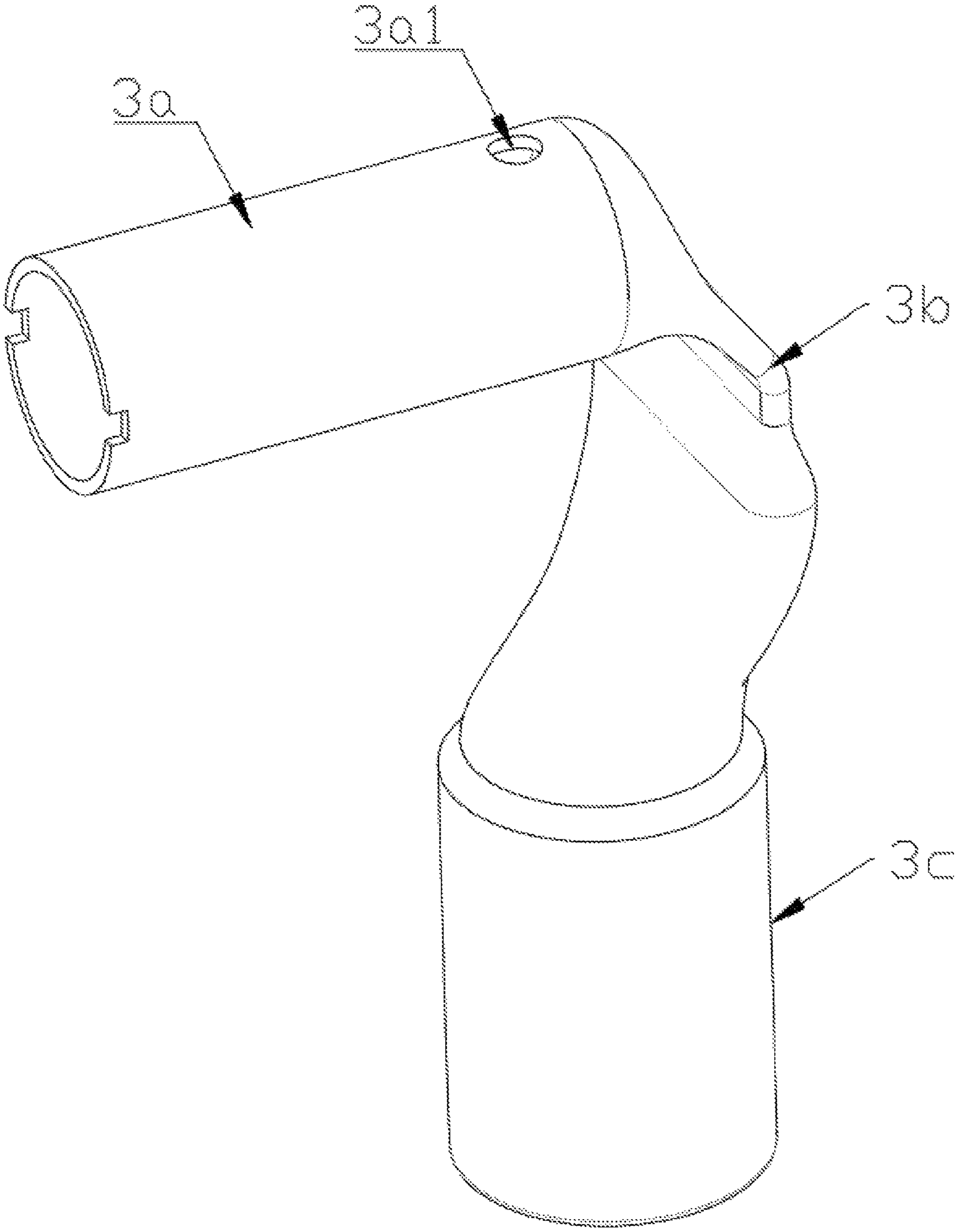
FIG. 3 is a schematic diagram of the external structure of a plug terminal using a second basic structure.
Figure 4:
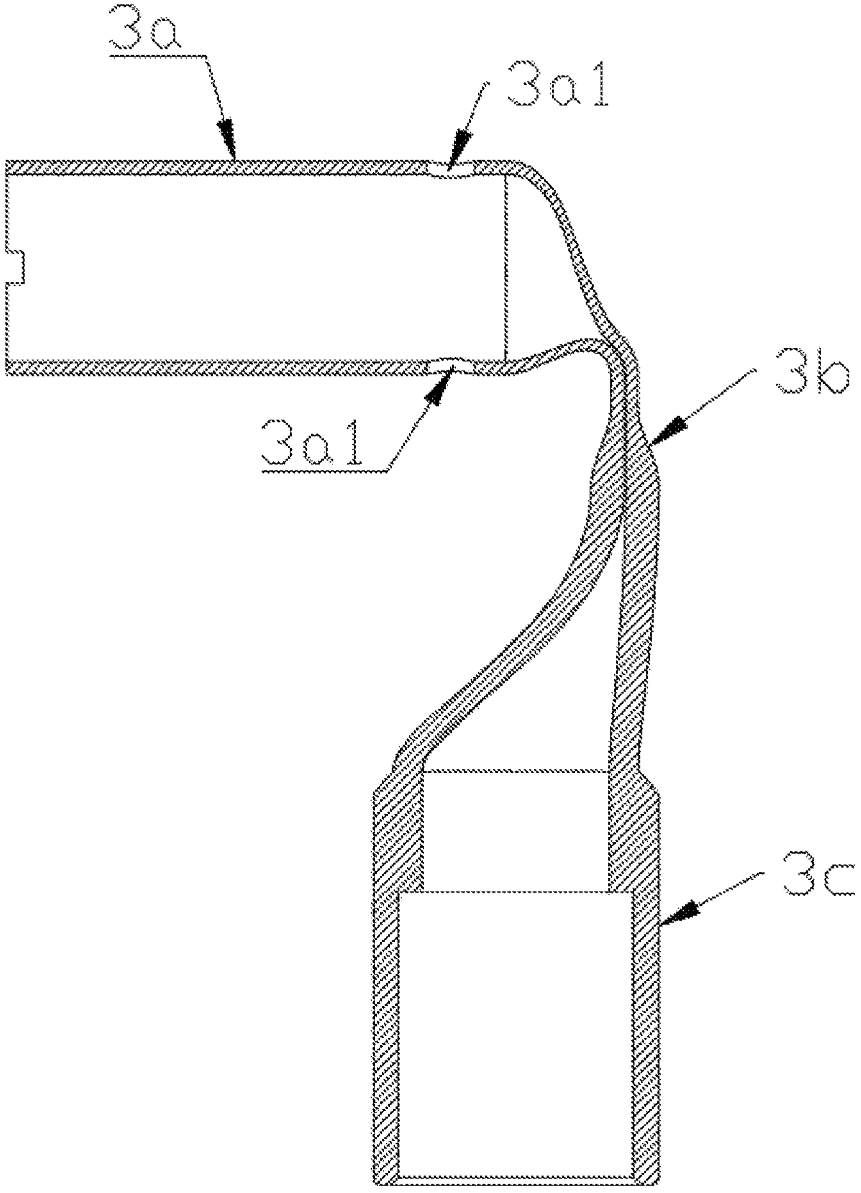
FIG. 4 is a schematic diagram of the cross-sectional structure of a plug terminal using a second basic structure.
Figure 5:
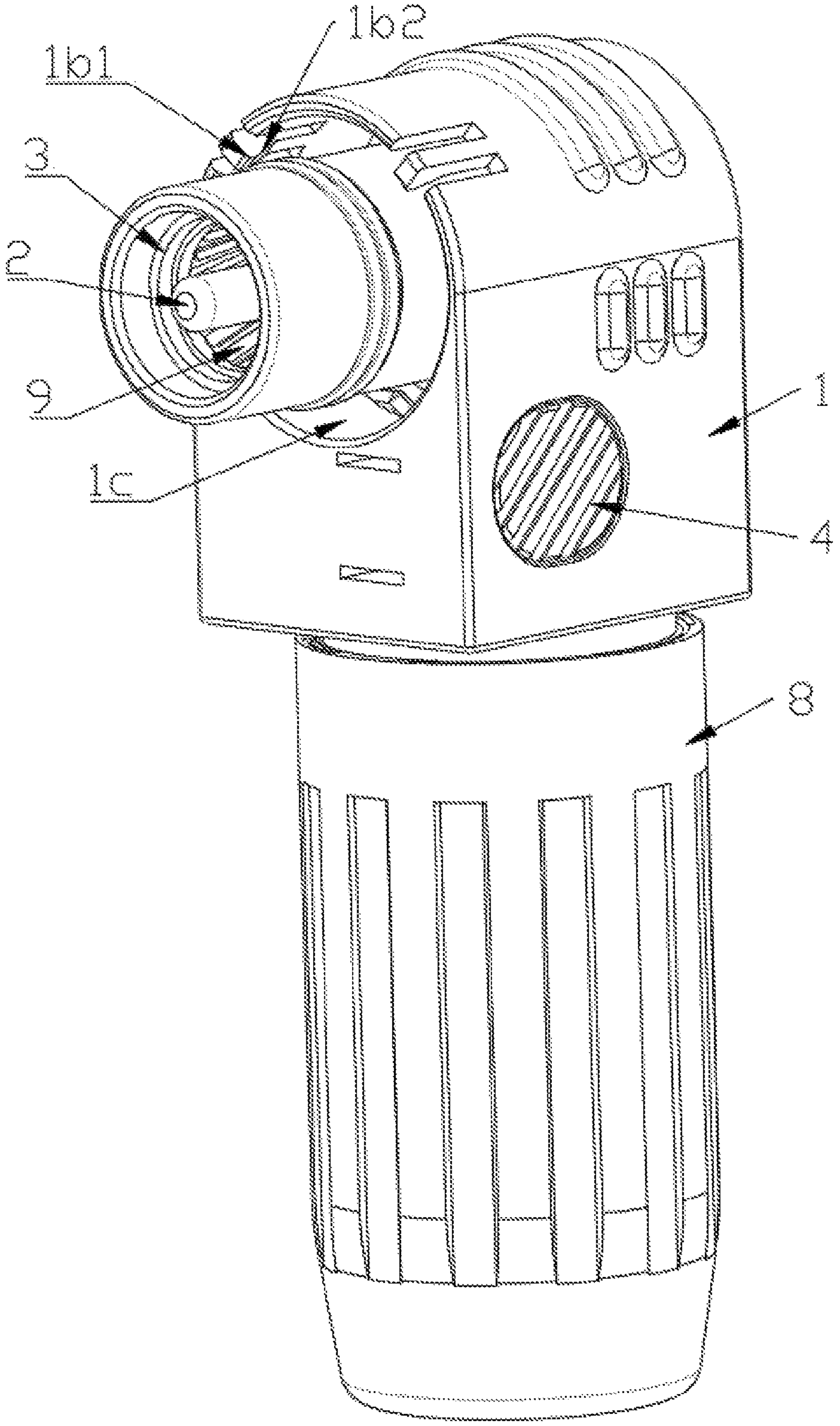
FIG. 5 is a schematic diagram of the external structure of a plug.
Figure 6:
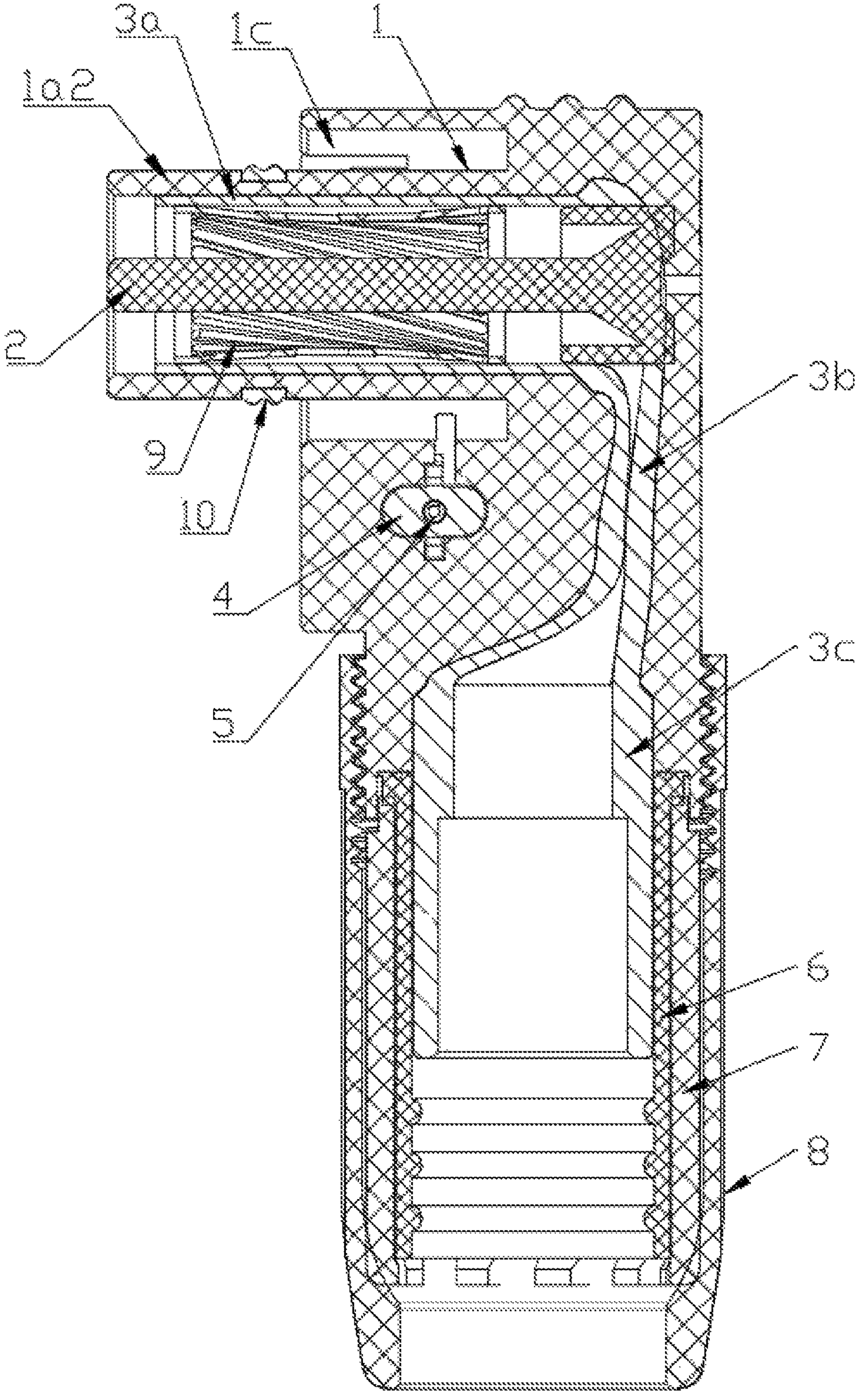
FIG. 6 is a schematic diagram of the cross-sectional structure of a plug of a plug terminal using a first basic structure.
Figure 7:
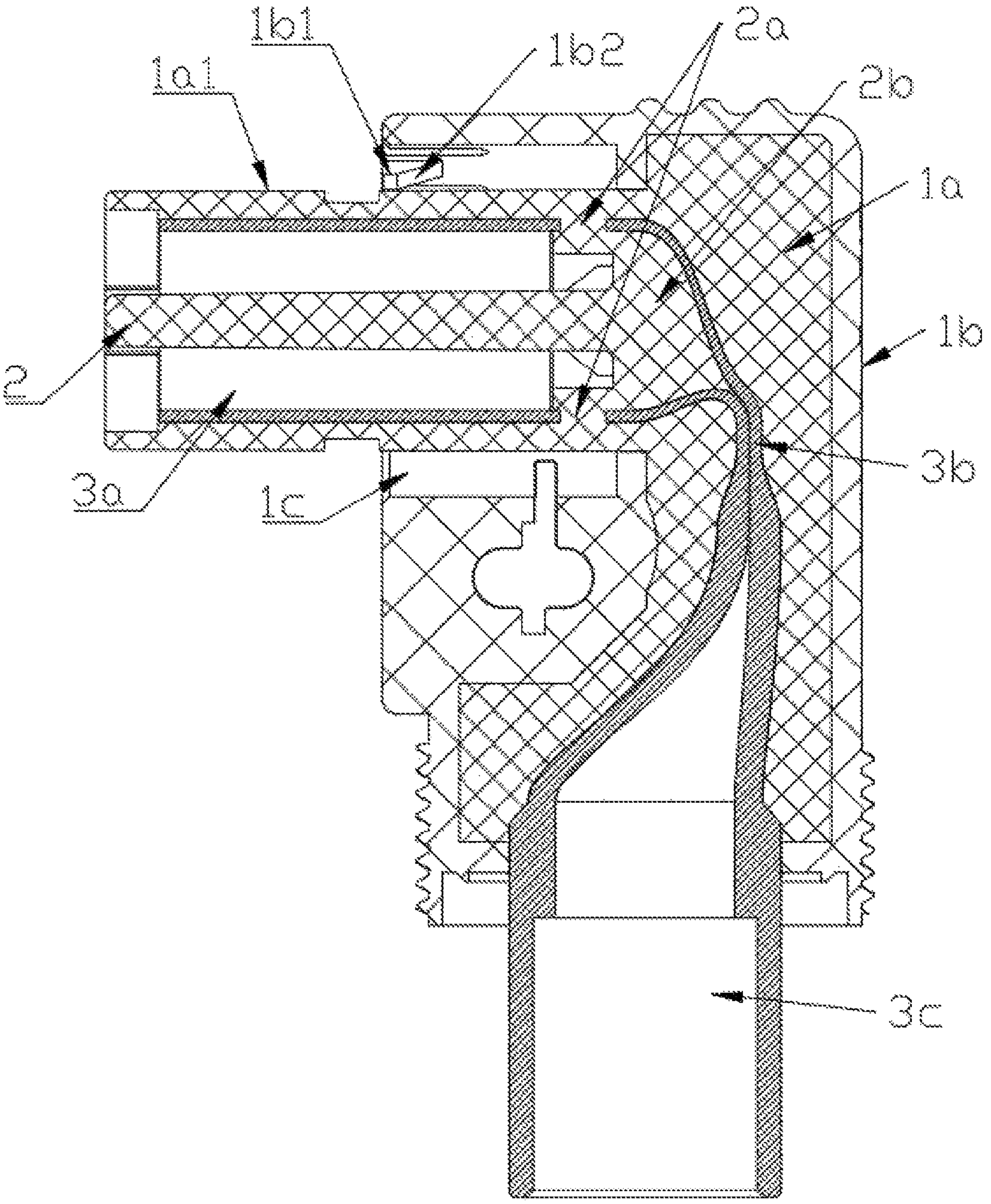
FIG. 7 is a schematic diagram of the cross-sectional structure of a plug terminal, an internal mold and an external mold of a second basic structure.
Figure 8:
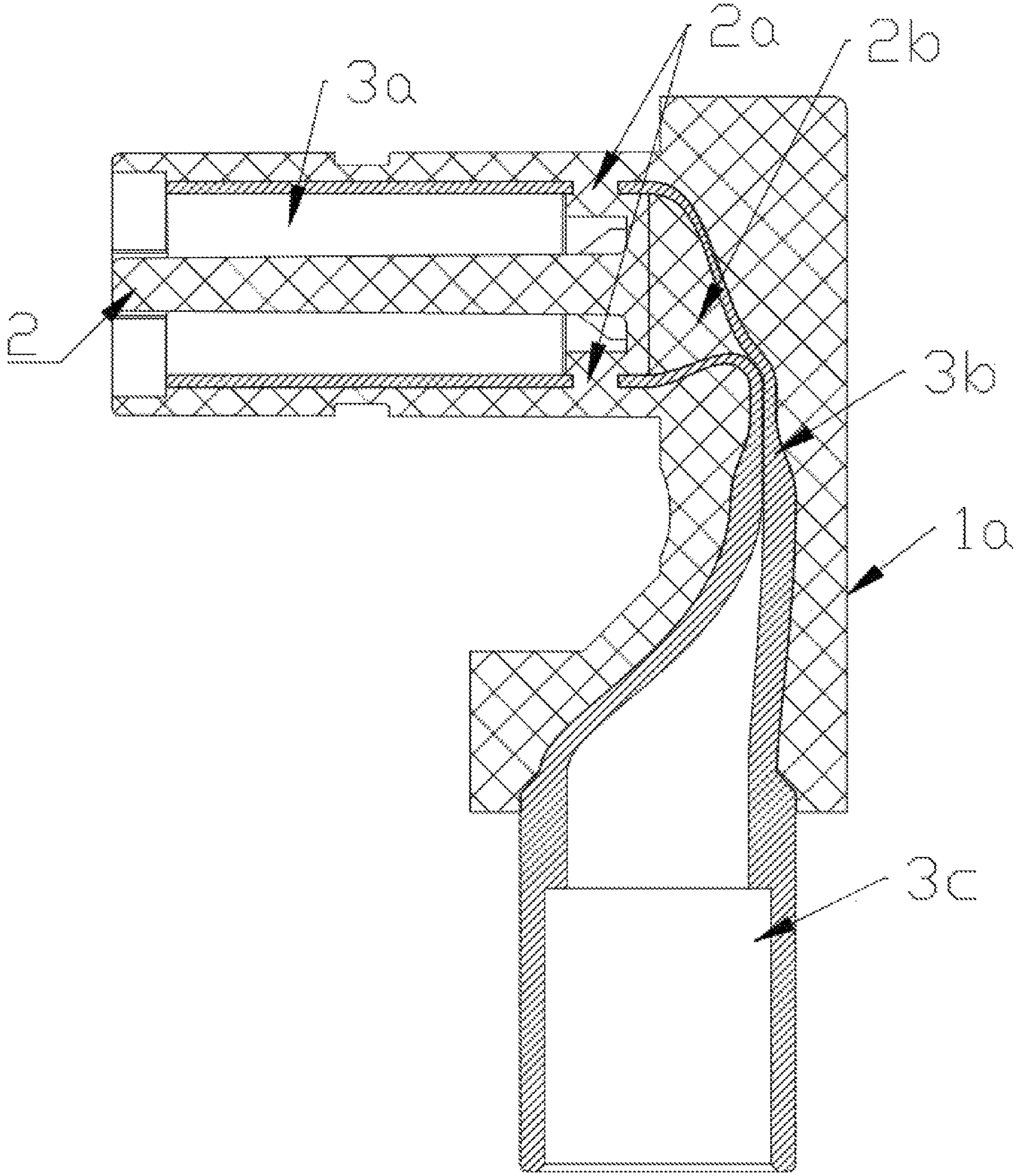
FIG. 8 is a schematic diagram of the cross-sectional structure of a plug terminal and an internal mold of a second basic structure.
Figure 9:
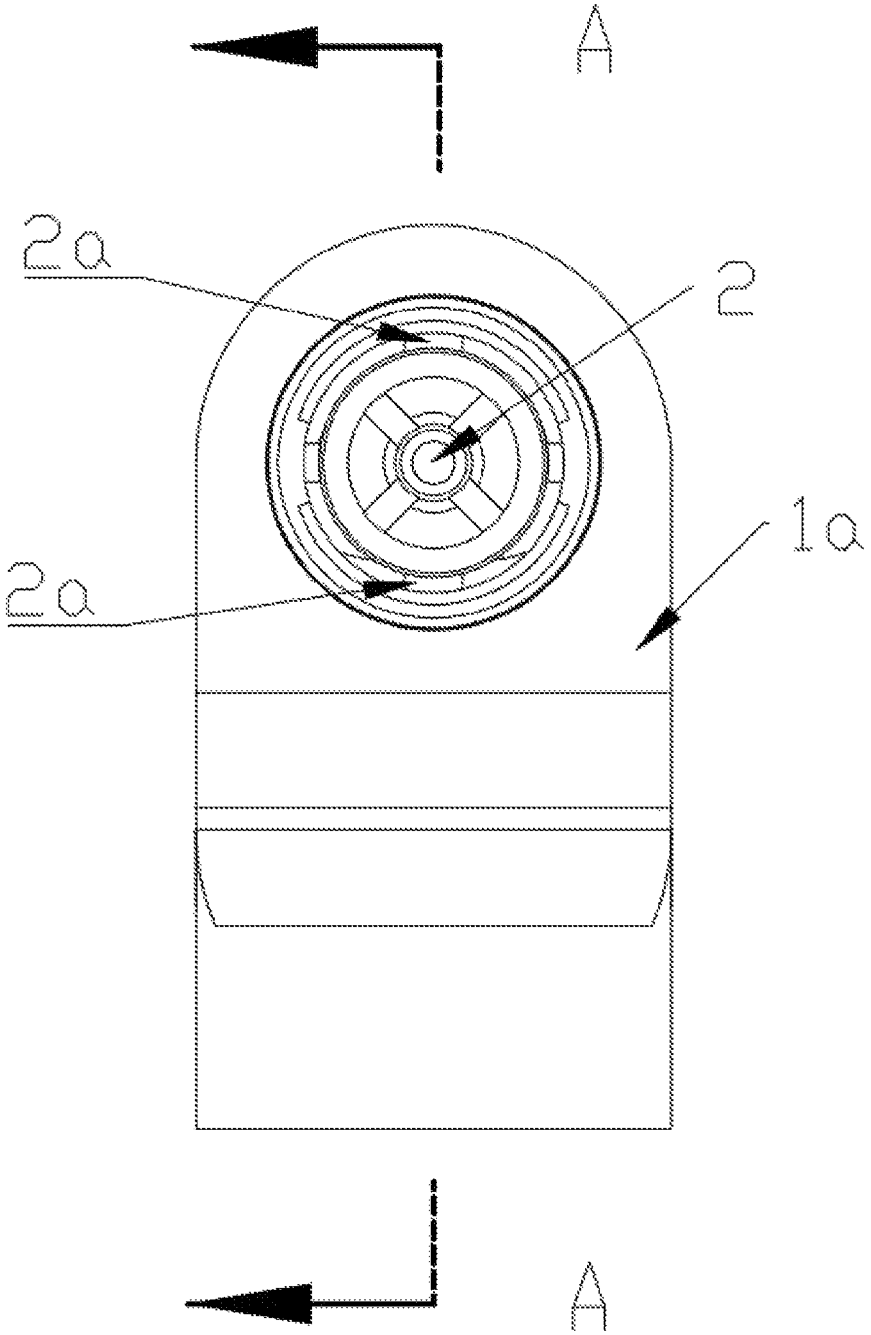
FIG. 9 is a schematic front view of an internal mold.
Figure 10:
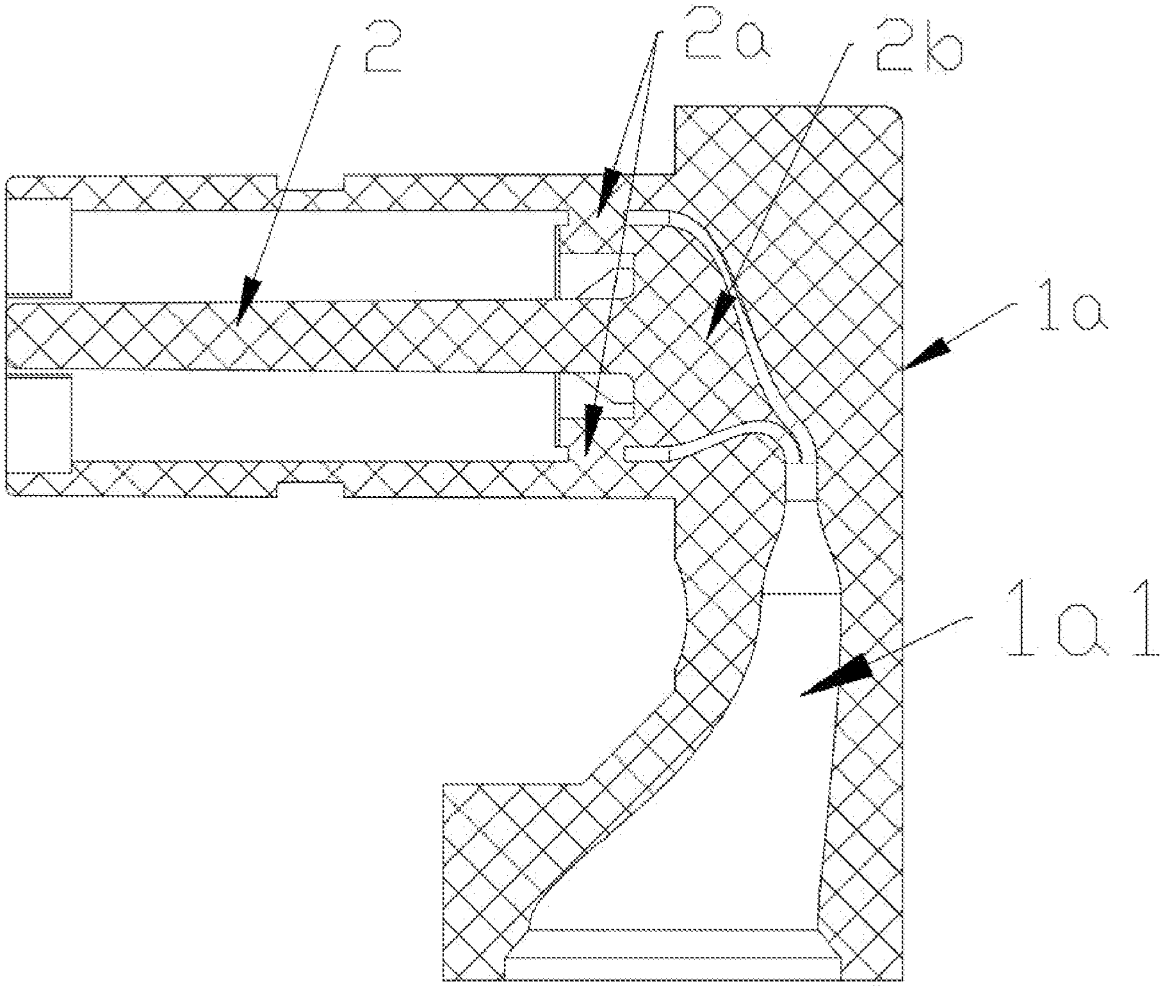
FIG. 10 is a cross-sectional view taken along line A-A of FIG. 9.
Figure 11:
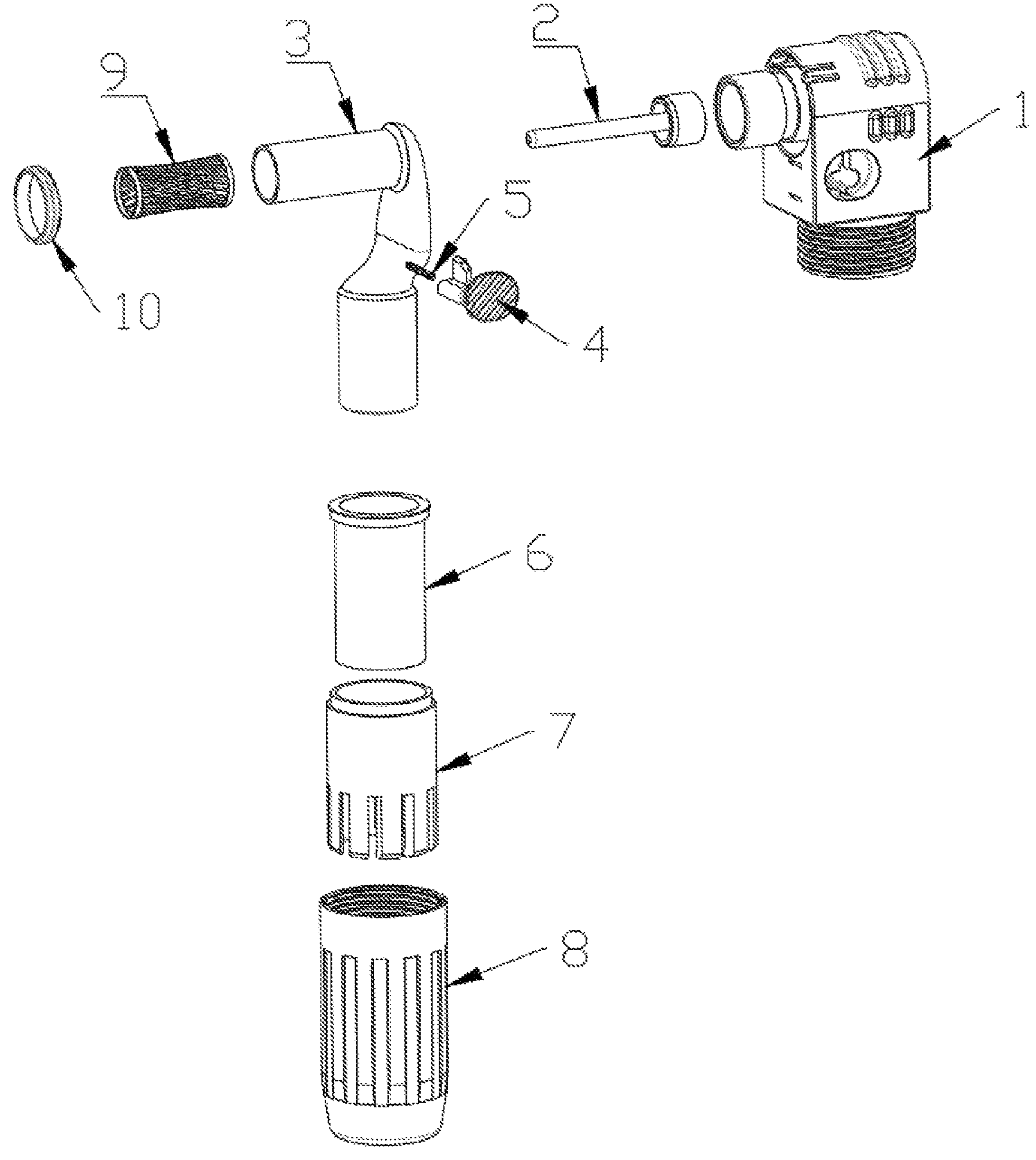
FIG. 11 is an explosion schematic diagram of a plug.
Figure 12:
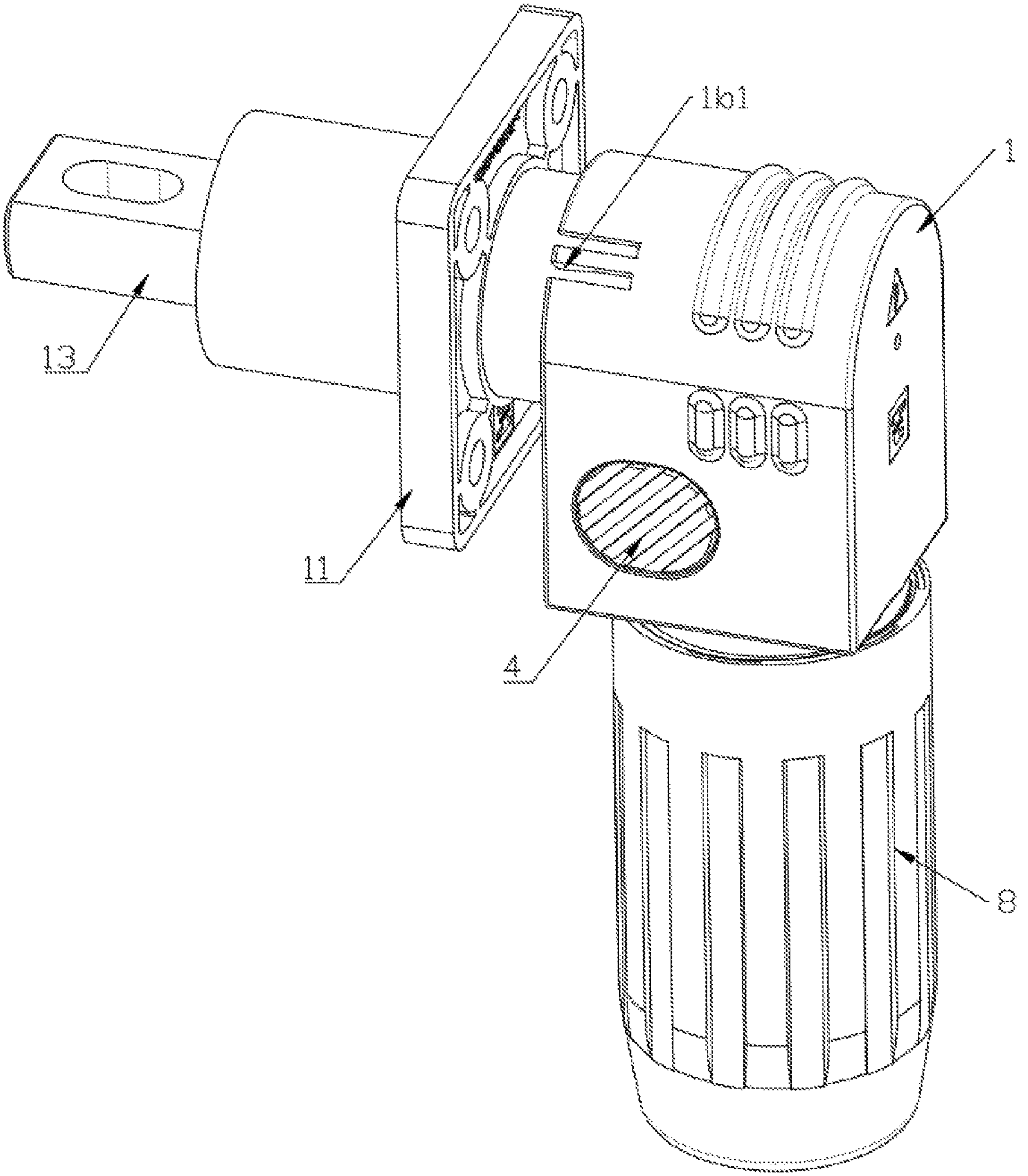
FIG. 12 is a schematic diagram of an external structure of an energy storage high-voltage connector after being inserted.
Figure 13:
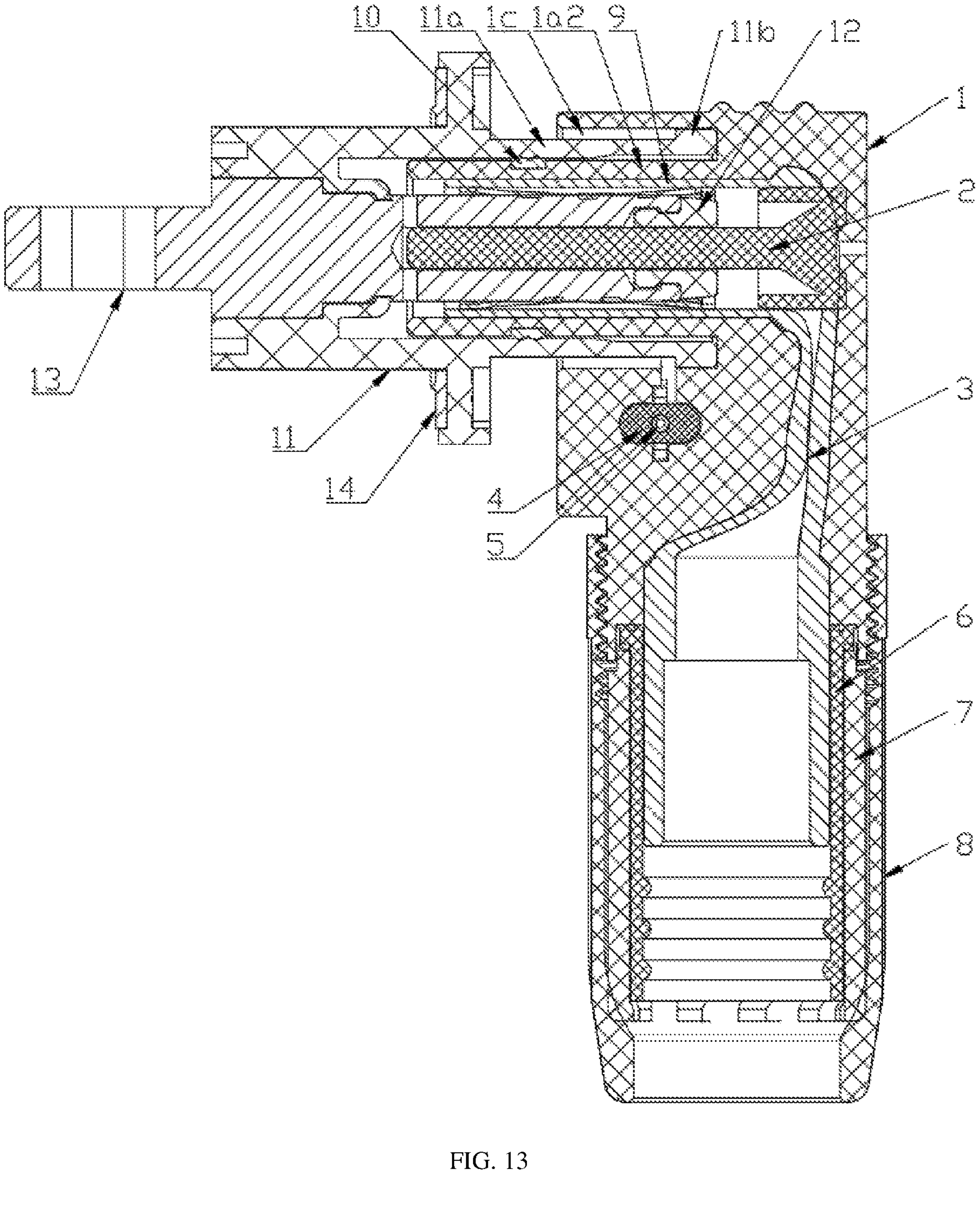
FIG. 13 is a schematic diagram of an internal structure of an energy storage high-voltage connector after being inserted.
Figure 14:
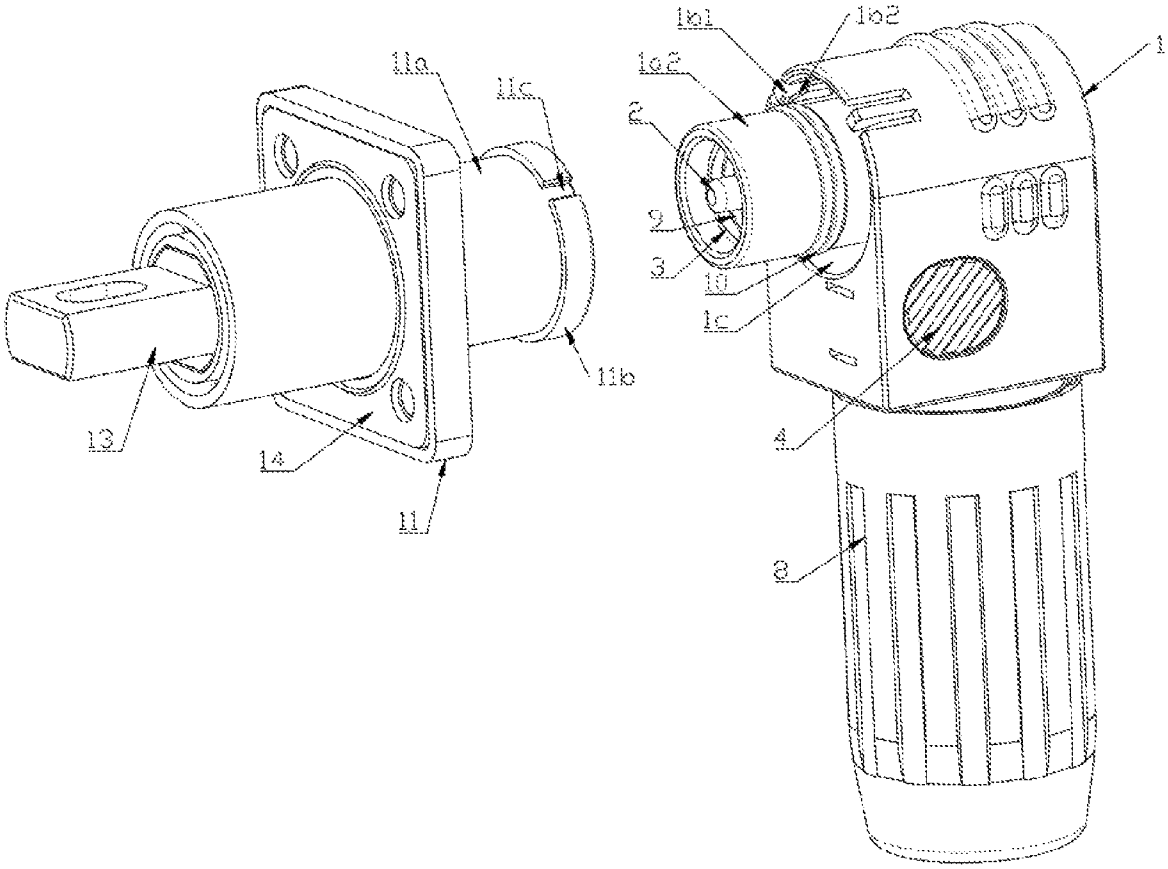
FIG. 14 is a schematic structural diagram of an energy storage high-voltage connector before being inserted.
Figure 15:
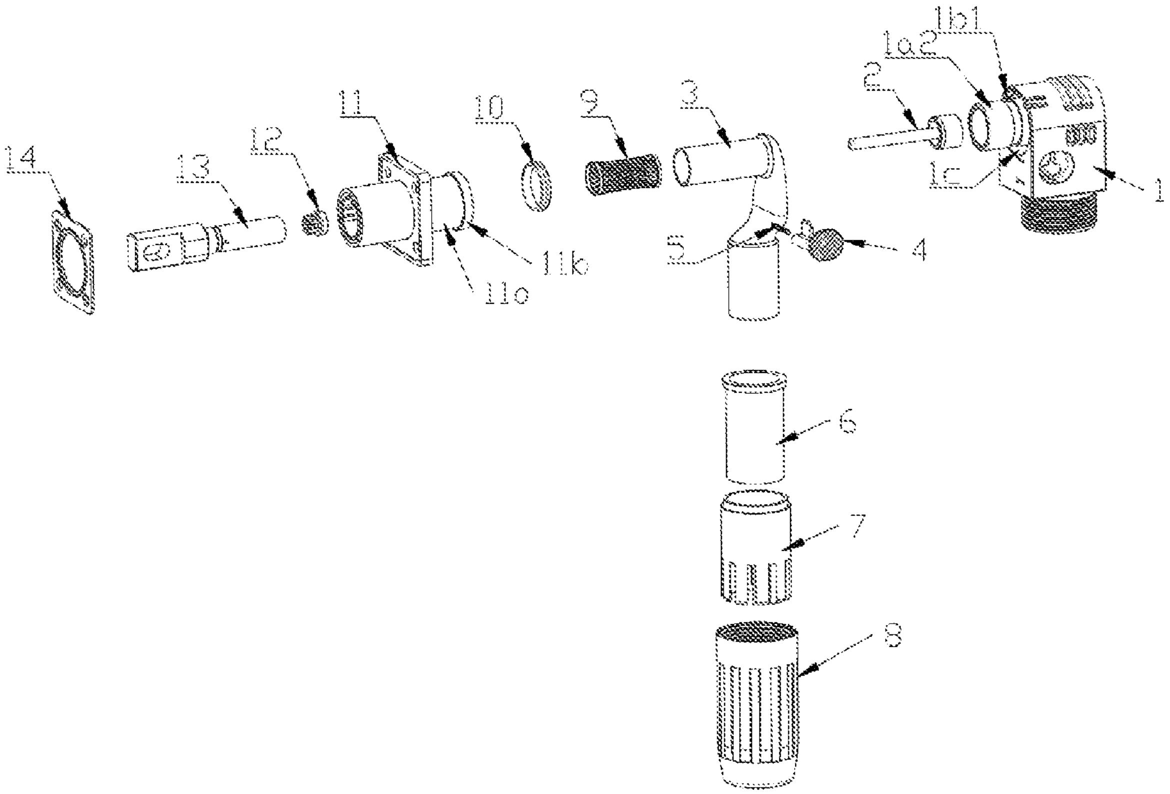
FIG. 15 is an explosion schematic diagram of an energy storage high-voltage connector.
Figure 16:
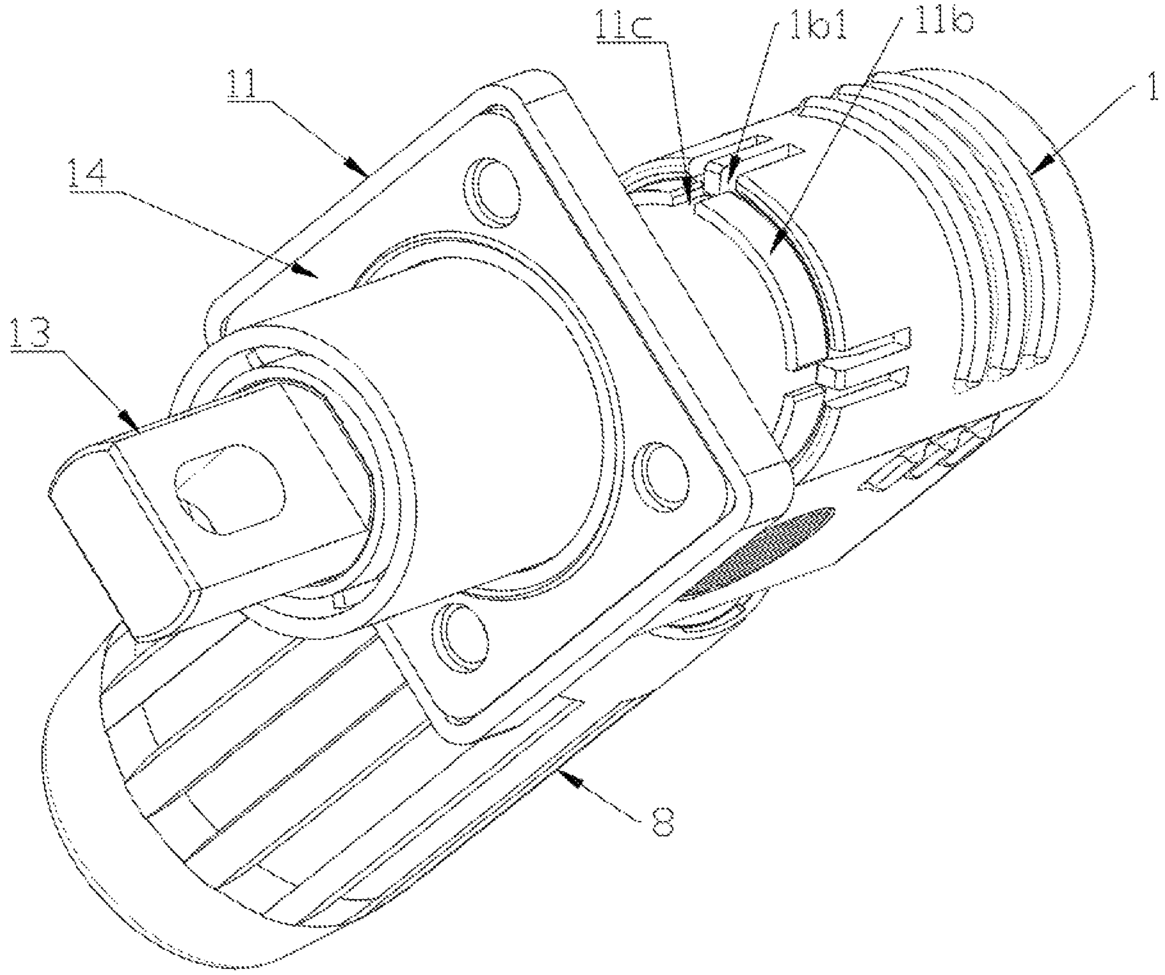
FIG. 16 shows the alignment of a finger and a second through slot during insertion.
Figure 17:
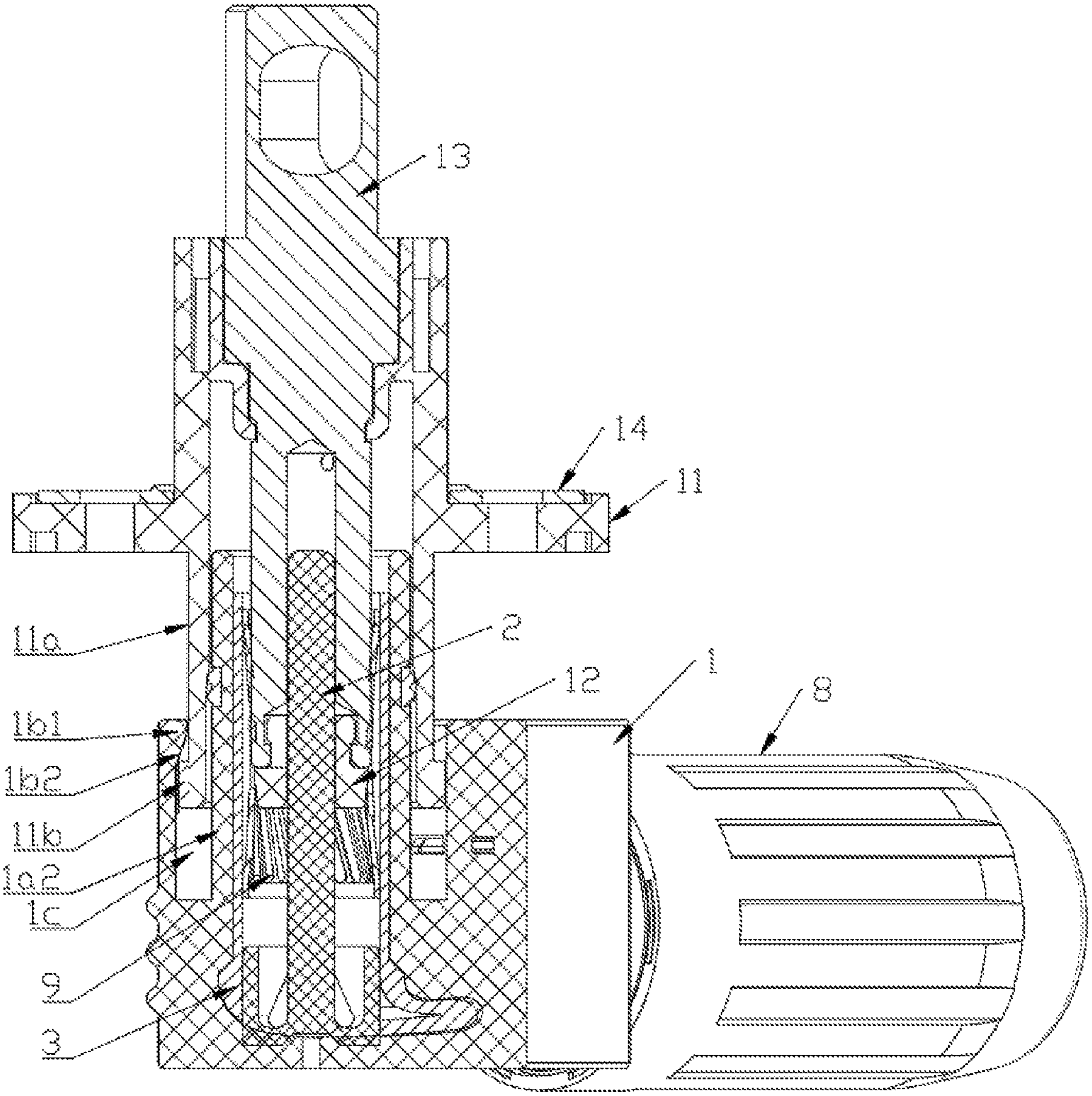
FIG. 17 shows the position relationship between a guide block and a convex ring after a plug is inserted into a socket.

For the plug terminal 3, the nozzle of the plug-in pipe body 3*a* and the nozzle of the wiring pipe body 3*c* have a hole structure. In addition, for the plug terminal 3, one end of the flat pipe section 3*b* connected with the plug-in pipe body 3*a* is provided with a through hole 3*d*, and the axis of the through hole 3*d* is collinear with the axis of the plug-in pipe body 3*a*. The plug anti-contact pointer 2 is inserted into the through hole. The plug terminal 3 with this basic structure is suitable for the plug in which the plug anti-contact pointer 2 is assembled with the housing. A second basic structure is shown in FIGS. 3 and 4. For the plug terminal 3, the nozzle of the plug-in pipe body 3*a* and the nozzle of the wiring pipe body 3*c* have a hole structure. In addition, the peripheral wall of the plug-in pipe body 3*a* is provided with a piercing hole 3*a*1. The plug terminal 3 with this basic structure is suitable for the plug in which the plug anti-contact pointer 2 is integrally molded with the housing. Of course, the plug terminal 3 with this basic structure can also be provided with the through hole 3*d* in the first basic structure, but it is not necessary.

Embodiment 2

This embodiment is further optimized on the basis of the above embodiment. Further, in order to better realize the present disclosure, the following arrangement structure is particularly used.

In this embodiment, the single pipe used in this plug terminal is a reducer with large and small heads, in which the outer diameter of the plug-in pipe body 3*a* is smaller than that of the wiring pipe body 3*c*, the flat pipe section 3*b* is formed by pressing after bending a section of the single pipe with a smaller outer diameter, and the inner diameter of the plug-in pipe body 3*a* is smaller than that of the wiring pipe body 3*c*.

Embodiment 3

This embodiment further provides a plug on the basis of any of the above embodiments. The following arrangement structure is particularly used.

In this embodiment, the plug comprises the plug terminal in any of the above embodiments, wherein the plug terminal used by the plug in this embodiment is of a first basic structure.

As shown in FIG. 1, FIG. 2, FIG. 5, FIG. 6 and FIG. 11, the plug further comprises a shell consisting of a plug housing 1 and a plug nut 8, as well as a plug T-shaped waterproof ring 6, a plug wire clamping cap 7, a plug rotary spring terminal 9, a plug waterproof ring 10, a plug anti-contact pointer 2, a plug button 4 and a plug spring 5.

The plug anti-contact pointer 2 and the plug housing 1 are assembled in a split manner.

Specifically, a cavity 1*a*1 is provided inside the plug housing 1. The plug-in pipe body 3*a*, the flat pipe section 3*b* and the upper half section of the wiring pipe body 3*c* of the plug terminal are integrally arranged in the cavity. A plug T-shaped waterproof ring 6 is sleeved on the lower half section of the wiring pipe body 3*c*. A plug wire clamping cap 7 is sleeved on the plug T-shaped waterproof ring 6. The plug nut 8 is sleeved on the plug wire clamping cap 7, and the top of the plug nut is screwed with the bottom of the plug housing 1 to fasten the wiring pipe body 3*c*, the plug T-shaped waterproof ring 6 and the plug wire clamping cap 7 together. The plug housing 1 is sleeved with a plug waterproof ring 10 on a part of the structure of the plug-in pipe body 3*a*. A plug rotary spring terminal 9 is inserted into the plug-in pipe body 3*a*. A plug anti-contact pointer 2 extending into the plug-in pipe body 3*a* is inserted into the plug-in pipe body 3*a* through a through hole 3*d*. The plug anti-contact pointer 2 passes through the plug rotary spring terminal 9 without protruding out of the plug housing 1. The plug button 4 is movably inserted into the plug housing 1. A plug spring 5 for resetting the plug button 4 is sleeved on the plug button 4. When the plug button 4 is used in cooperation with the plug spring 5, the plug can be locked with the socket when the plug is connected with the socket.

Embodiment 4

This embodiment further provides a plug on the basis of the above embodiment 1 or 2. The following arrangement structure is particularly used.

In this embodiment, the plug comprises the plug terminal in any of the above embodiments, wherein the plug terminal used by the plug in this embodiment is of a second basic structure.

As shown in FIG. 3, FIG. 4, FIG. 5, FIG. 7, FIG. 8, FIG. 9, FIG. 10 and FIG. 11, the plug further comprises a shell consisting of a plug housing 1 and a plug nut 8, as well as a plug T-shaped waterproof ring 6, a plug wire clamping cap 7, a plug rotary spring terminal 9, a plug waterproof ring 10, a plug anti-contact pointer 2, a plug button 4 and a plug spring 5.

The plug anti-contact pointer 2 and the plug housing 1 are integrally molded by injection molding.

Specifically, a cavity 1*a*1 is provided inside the plug housing 1. The plug-in pipe body 3*a*, the flat pipe section 3*b* and the upper half section of the wiring pipe body 3*c* of the plug terminal 3 are integrally arranged in the cavity. A plug T-shaped waterproof ring 6 is sleeved on the lower half section of the wiring pipe body 3*c*. A plug wire clamping cap 7 is sleeved on the plug T-shaped waterproof ring 6. The plug nut 8 is sleeved on the plug wire clamping cap 7, and the top of the plug nut is screwed with the bottom of the plug housing 1 to fasten the wiring pipe body 3*c*, the plug T-shaped waterproof ring 6 and the plug wire clamping cap 7 together. The plug housing 1 is sleeved with a plug waterproof ring 10 on a part of the structure of the plug-in pipe body 3*a*. A plug rotary spring terminal 9 is inserted into the plug-in pipe body 3*a*. A plug anti-contact pointer 2 coaxially arranged with the plug-in pipe body 3*a* is arranged in the plug-in pipe body 3*a*, and the peripheral wall of the plug-in pipe body 3*a* is provided with a plurality of circular piercing holes 3*a*1. At the same time, the plug anti-contact pointer 2 is fixedly connected with a cylindrical connecting post 2*a* extending laterally along the radial direction in the position near the tail of the plug anti-contact pointer. The connecting post 2*a* is fixedly connected with the inner wall of the cavity of the plug housing 1 after passing through the piercing holes 3*a*1 in the radial direction. The connecting post 2*a* is integrally molded with the plug anti-contact pointer 2 and the inner wall of the cavity of the plug housing 1. A piercing hole 3*a*1 penetrate through a connecting post 2*a* correspondingly. The plug anti-contact pointer 2 passes through the plug rotary spring terminal 9 without protruding out of the plug housing 1. The plug button 4 is movably inserted into the plug housing 1. A plug spring 5 for resetting the plug button 4 is sleeved on the plug button 4. When the plug button 4 is used in cooperation with the plug spring 5, the plug can be locked with the socket when the plug is connected with the socket.

Preferably, two piercing holes 3*a*1 are provided in the plug-in pipe body 3*a*, and the two piercing holes 3*a*1 are symmetrically distributed along the radial direction of the plug-in pipe body 3*a*.

The molding process of the plug anti-contact pointer 2 and the plug housing 1 is as follows:

1, debugging an injection molding machine, and cleaning the injection molding machine as required;

2, installing an injection mold, wherein in the stage of installing the injection mold, the plug terminal 3 is installed on the mold for molding the plug anti-contact pointer;

3, preheating the mold;

4, baking materials, wherein in the material baking stage, the injection process parameters of the injection molding machine are set, including injection molding pressure, injection molding time, injection molding temperature, pressure holding time and cooling time;

5, filling, wherein in the filling stage, the rubber material will be molded into the mold of the plug anti-contact pointer through the flow channel of the piercing hole 3*a*1 on the plug-in pipe body 3*a*, so that the plug anti-contact pointer 2 and the plug housing 1 can be molded at one time;

6, holding pressure;

7, cooling;

8, demolding;

9, inspecting surface quality;

10, cleaning, including taking degraded material;

11, final inspection.

Because the plug anti-contact pointer 2 is integrally molded with the plug housing 1, during molding, the rubber material can flow into the part where the plug-in pipe body 3*a* is connected with the flat pipe section 3*b* in the plug terminal 3 to form the tail 2*b* of the plug anti-contact pointer 2, so that the tail 2*b* is hermetically connected with the inner wall of the plug terminal 3 to seal off the plug-in pipe body 3*a* from the wiring pipe body 3*c*. In this way, even if the inner wall of the flat pipe section 3*b* uses a misfitting flattened structure, or uses a flattened structure that fits the inner wall, but there is a gap through which airflow can pass, the inner wall can be blocked by the tail 2*b*, thus ensuring the non-connectivity between both ends of the plug terminal 3.

In this embodiment, the plug anti-contact pointer 2 and the plug housing 1 are integrally molded by injection molding, so that the concentricity of the plug anti-contact pointer 2 and the plug-in pipe body 3*a* of the plug terminal 3 can be ensured, and the possibility that the plug anti-contact pointer 2 is loosened due to assembly problems can be eliminated. The smoothness when the plug is inserted into the socket can be maintained for a long time, and the one-time molding process can be reduced, so that the production cost can be reduced. The gap between the plug-in pipe body 3*a* of the plug terminal 3 and the wiring pipe body 3*c* is blocked by the tail 2*b* of the plug anti-contact pointer 2, so that the water vapor entering from the plug-in pipe body 3*a* cannot reach the wiring pipe body 3*c* through the inside of the plug terminal 3, resulting in oxidation of the wire conductor.

Embodiment 5

This embodiment further provides a plug on the basis of the above embodiments 3 and 4. The following arrangement structure is particularly used.

In this embodiment, as shown in FIG. 7, FIG. 8, FIG. 9 and FIG. 10, the plug housing 1 of the plug comprises an internal mold 1*a* and an external mold 1*b*. The internal mold 1*a* and the external mold 1*b* are formed by twice injection molding. The internal mold 1*a* is sleeved on the plug terminal 3 for integrally molding, and the external mold 1*b* is sleeved on the internal mold 1*a* for integrally molding. The cavity 1*a*1 is located in the internal mold 1*a*, the shape of the cavity 1*a*1 matches the shape of the plug terminal 3, and the plug terminal 3 is fixed in the cavity 1*a*1. The connecting post 2*a* is integrally molded and fixed with the internal mold 1*a*.

Embodiment 6

This embodiment further provides an energy storage high-voltage connector on the basis of the above embodiment 3 or 4. The following arrangement structure is particularly used.

The energy storage high-voltage connector comprises the plug of the above embodiment 3 or 4 and the socket used in cooperation with the plug. The plug is detachably inserted into the socket. When the plug is inserted into the socket, the plug terminal 3 installed in the plug is connected with the socket terminal 13 installed in the socket, and the plug button 4 on the plug can be inserted into and locked with the locking slot on the socket.

Embodiment 7

This embodiment is further optimized on the basis of the above embodiment 6. Further, in order to better realize the present disclosure, the following arrangement structure is particularly used.

In this embodiment, the energy storage high-voltage connector has both the function of preventing the wrong insertion of the positive and negative electrodes and the function of rotating 360 degrees after being inserted, as shown in FIG. 1 to FIG. 17.

The energy storage high-voltage connector comprises a plug and a socket which are detachably inserted together. After the plug is inserted into the socket, the plug terminal 3 installed in the plug is connected with the socket terminal 13 installed in the socket. One end of the plug inserted into the socket is the inserting end. In this embodiment, the situation in which the plug and the socket of the plug terminal which use the first basic structure are inserted into each other are described first.

The plug comprises a plug housing 1, a plug anti-contact pointer 2, a plug terminal 3, a plug wire clamping cap 7, a plug nut 8 and a plug rotary spring terminal 9. A circular jack 1*c* extending in the axial direction is arranged at the inserting end of the plug housing 1. A first circular plug barrel 1*a*2 coaxial with the jack 1*c* is arranged at the bottom position of the hole in the jack 1*c*. An annular space into which a second plug barrel 11*a* of the socket is inserted is formed between the outer wall of the first plug barrel 1*a*2 and the inner wall of the jack 1*c*. The end of the first plug barrel 1*a*2 extends out of the jack 1*c*. The plug-in pipe body 3*a* of the plug terminal 3 is coaxially arranged in the first plug barrel 1*a*2. The end of the plug-in pipe body 3*a* of the plug terminal 3 does not protrude out of the first plug barrel 1*a*2. A plug anti-contact pointer 2 arranged coaxially is inserted in the plug-in pipe body of the plug terminal 3. The plug wire clamping cap 7 is sleeved on the wiring pipe body of the plug terminal 3. The plug nut 8 is sleeved on the plug wire clamping cap 7, and the top of the plug nut is screwed with the bottom of the plug housing 1 to fasten the wiring pipe body 3*c* of the plug terminal 3 and the plug wire clamping cap 7 together. A plug rotary spring terminal 9 is arranged in the wiring pipe body 3*c* of the plug terminal 3.

The socket comprises a socket housing 11 and a socket terminal 13. The inserting end of the socket housing 11 is provided with a second circular plug barrel 11*a* which is detachably inserted in the annular space and is coaxially arranged with the socket 1*c*. The socket terminal 13 is coaxially installed in the second plug barrel 11*a*. The end of the socket terminal 13 is connected with a socket anti-contact finger cap 12 which is used in cooperation with the plug anti-contact pointer 2. The second plug barrel 11*a* is inserted into the annular space, and the socket terminal 13 is inserted into the plug rotary spring terminal 9. The plug anti-contact pointer 2 extends into the second plug barrel 11*a* and is inserted into the socket anti-contact finger cap 12. The hole wall of the jack 1*c* is provided with a plurality of first through slots which are arranged in sequence in the circumferential direction and extend in the radial direction, such as two first through slots shown in FIG. 14. The first through slots communicate the annular space in the hole wall of the jack 1*c* with the environment outside the hole wall. The first through slots form notches at the edge of the jack 1*c*. A finger extending towards the notch of the first through slot in the axial direction is arranged at the center of the slot bottom of the first through slot. Guide blocks 1*b*1 extending towards the outer wall of the second plug barrel 11*a* are arranged at the head ends of the finger. The radial inner side surface of the guide block 1*b*1 is in contact with the outer wall of the second plug barrel 11*a* or is provided with a radial gap so that the guide block 1*b*1 will not be too closely connected with the second plug barrel 11*a* after the plug and the socket are inserted into each other, so that the plug has the ability to rotate with respect to the socket about the axis of the jack 1*c*.

The outer wall of the inserting end of the second plug barrel 11*a* near the end is provided with a protrusion. The protrusion forms a convex ring 11*b* coaxial with the jack 1*c* around the circumferential direction of the second plug barrel 11*a*. The axial distance between the convex ring 11*b* and the guide block 1*b*1 is equal to or greater than 0, so that the convex ring 11*b* will not restrict the movement of the guide block 1*b*1 in the circumferential direction after the plug is inserted into the socket. The radius of the outer circular surface of the convex ring 11*b* is larger than the radial distance between the radial inner side surface of the guide block 1*b*1 and the axis of the jack 1*c*. The convex ring 11*b* is provided with a plurality of second through slots 11*c* which are arranged in sequence in the circumferential direction and extend in the axial direction. The slot bottom of the second through slot 11*c* is the outer wall of the second plug barrel 11*a*. The radial distance between the slot bottom of the second through slot 11*c* and the axis of the second plug barrel 11*a* is less than or equal to the radial distance between the radial inner side surface of the guide block 1*b*1 and the axis of the jack 1*c*.

The number of the second through slots 11*c* is equal to the number of the first through slots, and all the second through slots 11*c* and all the guide blocks 1*b*1 are axially aligned one by one in the circumferential direction. For example, on the plug housing 1, the included angle between two fingers is 60 degrees. Similarly, on the socket housing 11, the included angle between two second through slots 11*c* of the second plug barrel 11*a* is 60 degrees. In practical products, the energy storage high-voltage connector is provided with a negative electrode member and a positive electrode member cooperating with each other. When the negative electrode member is compared with the positive electrode member, there is a different number of the second through slots 11*c* and/or a different angle between two adjacent second through slots 11*c*, so as to distinguish the positive electrode from the negative electrode and avoid the wrong insertion of the positive electrode and the negative electrode.

In this embodiment, the situation in which the plug and the socket of the plug terminal which use the second basic structure are inserted into each other are described. In order to avoid repetition of contents, only the obvious differences from the plug of the plug terminal using the first basic structure are described here.

The plug housing 1 is a one-time injection-molded integrated structure or a two-time injection-molded integrated structure including an internal mold 1*a* and an external mold 1*b*, and the latter structure is taken as an example. A circular jack 1*c* extending in the axial direction is arranged at the inserting end of the plug housing 1 in the external mold 1*b*. A first circular plug barrel 1*a*2 coaxial with the jack is arranged at the bottom of the hole in the jack 1*c*. The first plug barrel 1*a*2 is the part of the internal mold 1*a* located in the jack 1*c* for wrapping the plug-in pipe body 3*a* of the plug terminal 3. An annular space is formed between the outer wall of the first plug barrel 1*a*2 and the inner wall of the jack 1*c*, that is, between the outer wall of the internal mold 1*a* and the inner wall of the external mold 1*b*, into which the second plug barrel 11*a* of the socket is inserted. The end of the first plug barrel 1*a*2 extends out of the jack 1*c*. The plug-in pipe body 3*a* of the plug terminal 3 is coaxially arranged in the first plug barrel 1*a*2. The end of the plug-in pipe body 3*a* of the plug terminal 3 does not protrude out of the first plug barrel 1*a*2. A plug anti-contact pointer 2 arranged coaxially is provided in the plug-in pipe body 3*a* of the plug terminal 3. The plug anti-contact pointer 2 does not protrude out of the first plug barrel 1*a*2. The plug wire clamping cap 7 is sleeved on the wiring pipe body 3*c* of the plug terminal 3. The plug nut 8 is sleeved on the plug wire clamping cap 7, and is screwed with the bottom of the external mold 1*b* of the plug housing 1 through the internal thread at the top to fasten the wiring pipe body 3*c* of the plug terminal 3 and the plug wire clamping cap 7 together. A plug rotary spring terminal 9 is fixed in the wiring pipe body 3*c* of the plug terminal 3.

In this embodiment, the plug housing 1 is provided with a circular jack 1*c*, and the socket housing 11 is provided with a second circular plug barrel 11*a*. In this way, there are no fool-proof structures such as bumps and chutes which are matched with each other at the inserting part of the plug housing 1 and the socket housing 11. The plug can rotate 360 degrees after being inserted, so as to facilitate wiring in different directions in the cabinet. Fingers are also arranged in the first through slots arranged in the plug housing 1, and guide blocks 1*b*1 are arranged at the ends of the fingers. Meanwhile, a convex ring 11*b* arranged on a second plug barrel 11*a* of the socket housing 11 is provided with second through slots 11*c* corresponding to the guide blocks 1*b*1 one by one, so that the plug housing 1 can only be inserted into the socket housing 11 at a specific angle. Because the number of the second through slots 11*c* is equal to the number of the first through slots, all the second through slots 11*c* and all the guide blocks 1*b*1 are axially aligned one by one in the circumferential direction. In this way, the plug housing 1 and the socket housing 11 have a fool-proof function, and only by changing the set number and the design angle of the second through slots 11*c* of the positive electrode and the negative electrode, the wrong insertion of the positive electrode and the negative electrode can be effectively prevented. After the plug is inserted to the socket, the axial distance between the convex ring 11*b* and the guide block 1*b*1 is equal to or greater than 0, so that the plug can rotate 360 degrees while having the fool-proof function.

Embodiment 8

This embodiment is further optimized on the basis of the above embodiment. Further, in order to better realize the present disclosure, the following arrangement structure is particularly used.

In this embodiment, a plug T-shaped waterproof ring 6 sleeved on the wiring pipe body of the plug terminal 3 is inserted into the plug wire clamping cap 7 of the energy storage high-voltage connector. The plug wire clamping cap 7 is sleeved on the plug T-shaped waterproof ring 6. The plug nut 8 is sleeved on the plug wire clamping cap 7, and the top of the plug nut is screwed with the bottom of the plug housing 1 to fasten the wiring pipe body 3*c* of the plug terminal 3, the plug T-shaped waterproof ring 6 and the plug wire clamping cap 7 together. A plug waterproof ring 10 is sleeved on the first plug barrel 1*a*2. A socket waterproof gasket 14 is sleeved on the socket housing 11.

Embodiment 9

This embodiment is further optimized on the basis of the above embodiment. Further, in order to better realize the present disclosure, the following arrangement structure is particularly used.

In this embodiment, the plug housing 1 of the energy storage high-voltage connector is provided with a locking mechanism for locking with the socket when being inserted into the socket.

The locking mechanism comprises a plug button 4 and a plug spring 5. The plug button 4 is movably inserted into a hole provided at the side of the plug housing 1. A plug spring 5 for resetting the plug button 4 with the plug housing 1 is sleeved on the plug button 4. When the plug button 4 is used in cooperation with the plug spring 5, the plug can be locked with the socket when the plug is connected with the socket. A stopper on the plug button 4 extends into the jack 1*c* from the hole to prevent the plug placed at one side of the convex ring 11*b* from slipping off the socket. By pressing the plug button 4, the stopper can be moved radially away from the convex ring 11*b* to contact and lock.

Example 10

This embodiment is further optimized on the basis of the above embodiment. Further, in order to better realize the present disclosure, the following arrangement structure is particularly used.

In this embodiment, the finger of the energy storage high-voltage connector has elasticity. The finger and the plug housing 1 are plastic parts with an integrated structure. The surface of the guide block 1*b*1 adjacent to the convex ring 11*b* is provided as a slope surface 1*b*2. In this way, when the plug is pulled out in the axial direction, in the case that the second through slot 11*c* and the corresponding guide block 1*b*1 are mutually staggered in the circumferential direction, the top of the convex ring 11*b* abuts against the slope surface 1*b*2, so that the fingers bend and deform outward and slide from the top of the convex ring 11*b* to finally detach the second plug barrel 11*a* from the jack 1*c*.

In this embodiment, the finger with elasticity can bend and deform to a certain extent in the radial direction, so that the end of the finger can be far from the axis of the jack 1*c*. Meanwhile, the surface of the guide block 1*b*1 adjacent to the convex ring 11*b* is provided as a slope surface 1*b*2, so that the guide block 1*b*1 can slide from the top of the convex ring 11*b* by jacking the fingers through the convex ring 11*b* when pulling out the plug. In this way, the plug can be pulled out from all directions without the guide block 1*b*1 withdrawing from the corresponding second through slot 11*c*.

Embodiment 11

This embodiment is further optimized on the basis of the above embodiment. Further, in order to better realize the present disclosure, the following arrangement structure is particularly used.

In this embodiment, one end face of the guide block 1*b*1 of the energy storage high-voltage connector far from the convex ring 11*b* and one end face of the convex ring 11*b* far from the guide block 1*b*1 are provided as planes perpendicular to the axis of the jack 1*c*. The violent insertion of the plug can be effectively prevented when one end face of the guide block 1*b*1 far from the convex ring 11*b* and one end face of the convex ring 11*b* far from the guide block 1*b*1 are provided as planes perpendicular to the axis of the jack 1*c*.

When the energy storage high-voltage connector of the present disclosure is inserted, the finger on the plug housing 1 is aligned with and inserted into the second through slot 11*c* on the matching socket housing 11. The guide block 1*b*1 on the finger passes through the second through slot 11*c* from one side of the convex ring 11*b* and moves to the other side of the convex ring 11*b*. The plug housing 1 and the socket housing 11 are locked after being inserted in place. At this time, the plug can rotate 360 degrees because the guide block 1*b*1 is located at the other side of the convex ring 11*b*. When pulling out the plug, it is only necessary to pull out the plug at any angle. When the plug is pulled out, in the case that the second through slot 11*c* and the corresponding guide block 1*b*1 are mutually staggered in the circumferential direction, the top of the convex ring 11*b* abuts against the slope surface 1*b*2, so that the fingers bend and deform outward and slide from the top of the convex ring 11*b* to finally detach the second plug barrel 11*a* from the jack 1*c*.

The above are only the specific embodiments of the present disclosure, but the scope of protection of the present disclosure is not limited thereto. Any changes or substitutions conceivable to those skilled in the art within the technical scope disclosed by the present disclosure should be covered by the scope of protection of the present disclosure.

What is claimed is:

1. A plug terminal, wherein the plug terminal (3) is arranged as a 90° elbow formed by bending the middle section of a single pipe, comprising a plug-in pipe body (3*a*), a flat pipe section (3*b*) and a wiring pipe body (3*c*) which are connected in sequence;

the axis of the plug-in pipe body (3*a*) is intersected with and is perpendicular to the axis of the wiring pipe body (3*c*); and the flat pipe section (3*b*) is arranged as a continuous flat pipe structure formed by pressing some pipe sections of the single pipe;

wherein the plug terminal (3) is arranged in the shell; and wherein the shell further comprises a plug housing (1), the plug terminal (3) is arranged in the plug housing (1), and a plug rotary spring terminal (9) is inserted into the plug-in pipe body (3*a*).

2. The plug terminal according to claim 1, wherein the flat pipe section (3*b*) is arranged as a flat pipe structure formed by pressing along the axial direction of the plug-in pipe body (3*a*).

3. The plug terminal according to claim 2, wherein the flat pipe section (3*b*) is arranged toward the side of the wiring pipe body (3*c*) far from the plug-in pipe body (3*a*).

4. The plug according to claim 1, wherein one end of the flat pipe section (3*b*) connected with the plug-in pipe body (3*a*) is provided with a through hole (3*d*), the axis of the through hole (3*d*) is collinear with the axis of the plug-in pipe body (3*a*), and a plug anti-contact pointer (2) extending into the plug-in pipe body (3*a*) is inserted into the through hole (3*d*).

5. The plug according to claim 1, wherein a plug anti-contact pointer (2) coaxially arranged with the plug-in pipe body (3*a*) is arranged in the plug-in pipe body (3*a*), and the peripheral wall of the plug-in pipe body (3*a*) is provided with a piercing hole (3*a*1);

the plug anti-contact pointer (2) is fixedly connected with a connecting post (2*a*) extending along the side of the plug anti-contact pointer, the connecting post (2*a*) is fixedly connected with the inner wall of the plug housing (1) through the piercing hole (3*a*1), and the connecting post (2*a*) is integrally molded with the plug anti-contact pointer (2) and the inner wall of the plug housing (1).

6. The plug according to claim 5, wherein the plug housing (1) comprises an internal mold (1*a*) and an external mold (1*b*), the internal mold (1*a*) is sleeved on the plug terminal (3) and is integrally molded therewith, and the external mold (1*b*) is sleeved on the internal mold (1*a*) and is integrally molded therewith;

the connecting post (2*a*) is integrally molded with the internal mold (1*a*).

7. The plug according to claim 5, wherein the plug-in pipe body (3*a*) is provided with two piercing holes (3*a*1) distributed in the radial direction, and each of the piercing holes (3*a*1) penetrates through the connecting post (2*a*).

8. The plug according to claim 5, wherein a tail (2*b*) of the plug anti-contact pointer (2) is in sealing connection with the inner wall of the plug terminal (3) to seal off the plug-in pipe body (3*a*) from the wiring pipe body (3*c*).

9. An energy storage high-voltage connector, comprising a socket and the plug according claim 1, wherein the plug and the socket are detachably inserted together, and the plug terminal (3) installed in the plug is connected with a socket terminal (13) installed in the socket.

10. The energy storage high-voltage connector according to claim 9, wherein a circular jack (1*c*) is arranged at the inserting end of the plug housing (1), the plug-in pipe body (3*a*) of the plug terminal (3) is coaxially arranged in the jack (1*c*); the socket comprises a socket housing (11), the inserting end of the socket housing (11) is provided with a second circular plug barrel (11*a*) detachably inserted into the jack (1*c*), the second plug barrel (11*a*) is coaxially arranged with the jack (1*c*), and the socket terminal (13) is coaxially arranged in the second plug barrel (11*a*);

the hole wall of the jack (1*c*) is provided with a plurality of first through slots which are arranged in sequence in the circumferential direction, the first through slots extend in the radial direction, notches of the first through slots are formed at the edge of the jack (1*c*), fingers extending axially towards the notches of the first through slots are arranged at the slot bottoms of the first through slots, guide blocks (1*b*1) extending towards the outer wall of the second plug barrel (11*a*) are arranged at the head ends of the fingers, the radial inner side surface of the guide block (1*b*1) is in contact with the outer wall of the second plug barrel (11*a*) or is provided with a radial gap so that the plug has the ability to rotate with respect to the socket about the axis of the jack (1*c*);

a convex ring (11*b*) coaxial with the jack (1*c*) is arranged on the outer wall of the inserting end of the second plug barrel (11*a*), the axial distance between the convex ring (11*b*) and the guide block (1*b*1) is equal to or greater than 0, the radius of the outer circular surface of the convex ring (11*b*) is larger than the distance between the radial inner side surface of the guide block (1*b*1) and the axis of the jack (1*c*), the convex ring (11*b*) is provided with a plurality of second through slots (11*c*) which are arranged in sequence in the circumferential direction and extend in the axial direction, and the radial distance between the slot bottom of the second through slot (11*c*) and the axis of the second plug barrel (11*a*) is less than or equal to the radial distance between the radial inner side surface of the guide block (1*b*1) and the axis of the jack (1*c*);

the number of the second through slots (11*c*) is equal to the number of the first through slots, and all the second through slots (11*c*) and all the guide blocks (1*b*1) are axially aligned one by one in the circumferential direction.

11. The energy storage high-voltage connector according to claim 10, wherein the energy storage high-voltage connector is provided with a negative electrode member and a positive electrode member cooperating with each other, and compared with the positive electrode member, the negative electrode member is provided with a different number of the second through slots (11*c*) and/or is provided with a different angle between two adjacent second through slots (11*c*).

12. The energy storage high-voltage connector according to claim 10, wherein the fingers are elastic, the surface of the guide block (1*b*1) adjacent to the convex ring (11*b*) is provided as a slope surface (1*b*2), when the plug is pulled out in the axial direction, in the case that the second through slot (11*c*) and the corresponding guide block (1*b*1) are mutually staggered in the circumferential direction, the top of the convex ring (11*b*) abuts against the slope surface (1*b*2), so that the fingers bend and deform outward and slide from the top of the convex ring (11*b*) to finally detach the second plug barrel (11*a*) from the jack (1*c*).

13. The energy storage high-voltage connector according to claim 12, wherein one end face of the guide block (1*b*1) far from the convex ring (11*b*) and one end face of the convex ring (11*b*) far from the guide block (1*b*1) are provided as planes perpendicular to the axis of the jack (1*c*).

14. The energy storage high-voltage connector according to claim 10, wherein a first plug barrel (1*a*2) protruding in the axial direction is arranged in the jack (1*c*), the plug-in pipe body (3*a*) of the plug terminal (3) is integrally located in the first plug barrel (1*a*2), and the first plug barrel (1*a*2) is detachably inserted into the second plug barrel (11*a*) in the axial direction.

15. The energy storage high-voltage connector according to claim 14, wherein the plug further comprises a plug wire clamping cap (7) sleeved on the wiring pipe body (3*c*) of the plug terminal (3) and a plug nut (8) sleeved on the plug wire clamping cap (7), and one end of the plug nut (8) is screwed with the plug housing (1).

16. The energy storage high-voltage connector according to claim 15, wherein a plug T-shaped waterproof ring (6) sleeved on the wiring pipe body (3*c*) of the plug terminal (3)

is inserted into the plug wire clamping cap (7), a plug waterproof ring (10) is sleeved on the first plug barrel (1*a*2), and the socket housing (11) is sleeved with a socket waterproof gasket (14).

17. The energy storage high-voltage connector according to claim 10, wherein the end of the socket terminal (13) is connected with a socket anti-contact finger cap (12) which is used in cooperation with the plug anti-contact pointer (2) arranged in the plug-in pipe body (3*a*) of the plug terminal (3).

18. The energy storage high-voltage connector according to claim 10, wherein the plug housing (1) is provided with a locking mechanism for locking with the socket when being inserted into the socket.

* * * * *